United States Patent
Price et al.

(10) Patent No.: US 12,360,379 B2
(45) Date of Patent: *Jul. 15, 2025

(54) EXTERNAL ILLUMINATION WITH REDUCED DETECTABILITY

(71) Applicant: Microsoft Technology Licensing, LLC, Redmond, WA (US)

(72) Inventors: Raymond Kirk Price, Carnation, WA (US); Christopher Douglas Edmonds, Carnation, WA (US); Michael Bleyer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,546

(22) Filed: Mar. 13, 2024

(65) Prior Publication Data

US 2024/0219734 A1   Jul. 4, 2024

Related U.S. Application Data

(63) Continuation of application No. 18/108,161, filed on Feb. 10, 2023, now Pat. No. 11,971,553, which is a continuation of application No. 17/306,517, filed on May 3, 2021, now Pat. No. 11,592,674.

(51) Int. Cl.
| | |
|---|---|
| *G01B 11/02* | (2006.01) |
| *G01S 17/894* | (2020.01) |
| *G02B 27/01* | (2006.01) |
| *H05B 47/11* | (2020.01) |
| *H05B 47/19* | (2020.01) |

(52) U.S. Cl.
CPC ........ *G02B 27/0172* (2013.01); *G01B 11/026* (2013.01); *G01S 17/894* (2020.01); *H05B 47/11* (2020.01); *H05B 47/19* (2020.01); *G02B 2027/0118* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 11,592,674 B2* | 2/2023 | Price | G02B 27/0172 |
| 11,971,553 B2* | 4/2024 | Price | G02B 19/0047 |

OTHER PUBLICATIONS

Notice of Allowance mailed on Mar. 12, 2024, in U.S. Appl. No. 18/108,161, (MS# 409793-US02-CON) 2 pages.

* cited by examiner

*Primary Examiner* — Anh Q Tran
(74) *Attorney, Agent, or Firm* — Workman Nydegger

(57) ABSTRACT

Disclosed herein are techniques for providing an illumination system that emits illumination into an environment while also enabling that system to be undetectable to certain types of external light detection systems. The system includes a single photon avalanche diode (SPAD) low light (LL) detection device and a light emitting device. The light emitting device provides illumination having a wavelength of at least 950 nanometers (nm). An intensity of the illumination is set to a level that causes the illumination to be undetectable from a determined distance away based on the roll off rate of the light. While the light emitting device is providing the illumination, the SPAD LL detection device generates an image of an environment in which the illumination is being provided.

20 Claims, 18 Drawing Sheets

EXTERNAL ILLUMINATION WITH REDUCED DETECTABILITY

CROSS-REFERENCE TO RELATED APPLICATIONS

This application is a continuation of U.S. patent application Ser. No. 18/108,161 filed on Feb. 10, 2023, entitled "External Illumination with Reduced Detectability," which is a continuation of U.S. patent application Ser. No. 17/306,517 filed on May 3, 2021, entitled "External Illumination with Reduced Detectability," which issued as U.S. Pat. No. 11,592,674 on Feb. 28, 2023, which applications are expressly incorporated herein by reference in their entirety.

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content. Use of the term "HMD" can also refer to a MR system.

A MR system can employ different types of cameras (aka "modalities") in order to display content to users. Often, cameras having different modalities are used to help the user of the MR system better see what is in his/her environment. For example, a low light camera can be used to observe content in low light environments.

MR systems are used in a wide variety of scenarios. By way of example, MR systems are often used in gaming scenarios, such as in paintball games. One objective of competing in a paintball game is to eliminate an opponent without getting eliminated. To do so, it is typically desirable to stealthily track one's opponent. Based on the desire to maintain stealth, one can appreciate how it is desirable to avoid being detected by opponents in the paintball game. Accordingly, there is a need in the technical field to improve how MR systems are used in order to avoid detection from other MR systems while achieving a particular level of performance.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, head mounted devices, hardware storage devices), and methods for providing an illumination system that provides illumination into an environment while also being undetectable to other systems, such as certain types of external light detection systems or systems that are a selected distance away.

Some embodiments include a single photon avalanche diode (SPAD) low light (LL) detection device and a light emitting device. The light emitting device provides illumination having a wavelength of at least 950 nanometers (nm). As a result of the illumination having a particular roll off rate, an intensity of the illumination is set to a particular intensity level to cause the illumination to be undetectable from a determined distance away, where the determined distance is based on the roll off rate. While the light emitting device is providing the illumination, the SPAD LL detection device is used to generate an image of an environment in which the illumination is being provided.

Some embodiments are configured to dynamically modify an amount of illumination generated by an illumination source to achieve or satisfy a particular performance level while also being undetectable by external light detection systems that are of a certain type and/or that are beyond a certain distance away. For example, some embodiments detect an amount of ambient light in an environment. The embodiments also select a distance away (e.g., from the computer system), where the selected distance is a distance that illumination light emitted by the computer system will be undetectable by one or more external light detection systems based on a roll off rate of the illumination light. Based on a feedback loop that uses a low noise low light detection device to detect a combination of the ambient light and the illumination light, the embodiments progressively increase, decrease, or perhaps maintain the amount of illumination light that is emitted into the environment until a threshold level is reached. The threshold level is based on a combination of the roll off rate of the illumination light and the selected distance such that, when the threshold level is reached, the low noise low light detection device is able to detect content up to the selected distance away but not beyond the selected distance as a result of the illumination light rolling off.

Some embodiments include a single photon avalanche diode (SPAD) low light (LL) detection device and a light emitting device. The light emitting device provides illumination light having a wavelength of at least 950 nanometers (nm). As a result of the illumination light having a particular roll off rate, the embodiments set an intensity of the illumination light to a particular intensity level to cause the illumination light to be undetectable at or from a determined distance away from the computer system, where the determined distance is based on the roll off rate. While the light emitting device is providing the illumination light, the SPAD LL detection device is used to generate an image of an environment in which the illumination is being provided. Additionally, the embodiments select a new distance away (e.g., from the computer system). The selected new distance is a distance that the illumination light will be undetectable by one or more external light detection systems based on the roll off rate of the illumination light. Based on a feedback loop that uses the SPAD LL detection device to detect at least some of the illumination light, the embodiments progressively increase, decrease, or perhaps maintain the amount of illumination light that is emitted into the environment by the light emitting device until a threshold level is reached. The threshold level is based on a combination of the roll off rate of the illumination light and the selected new distance such that, when the threshold level is reached, the SPAD LL detection device is able to detect content up to the selected new distance away but not beyond the selected new distance as a result of the illumination light rolling off.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
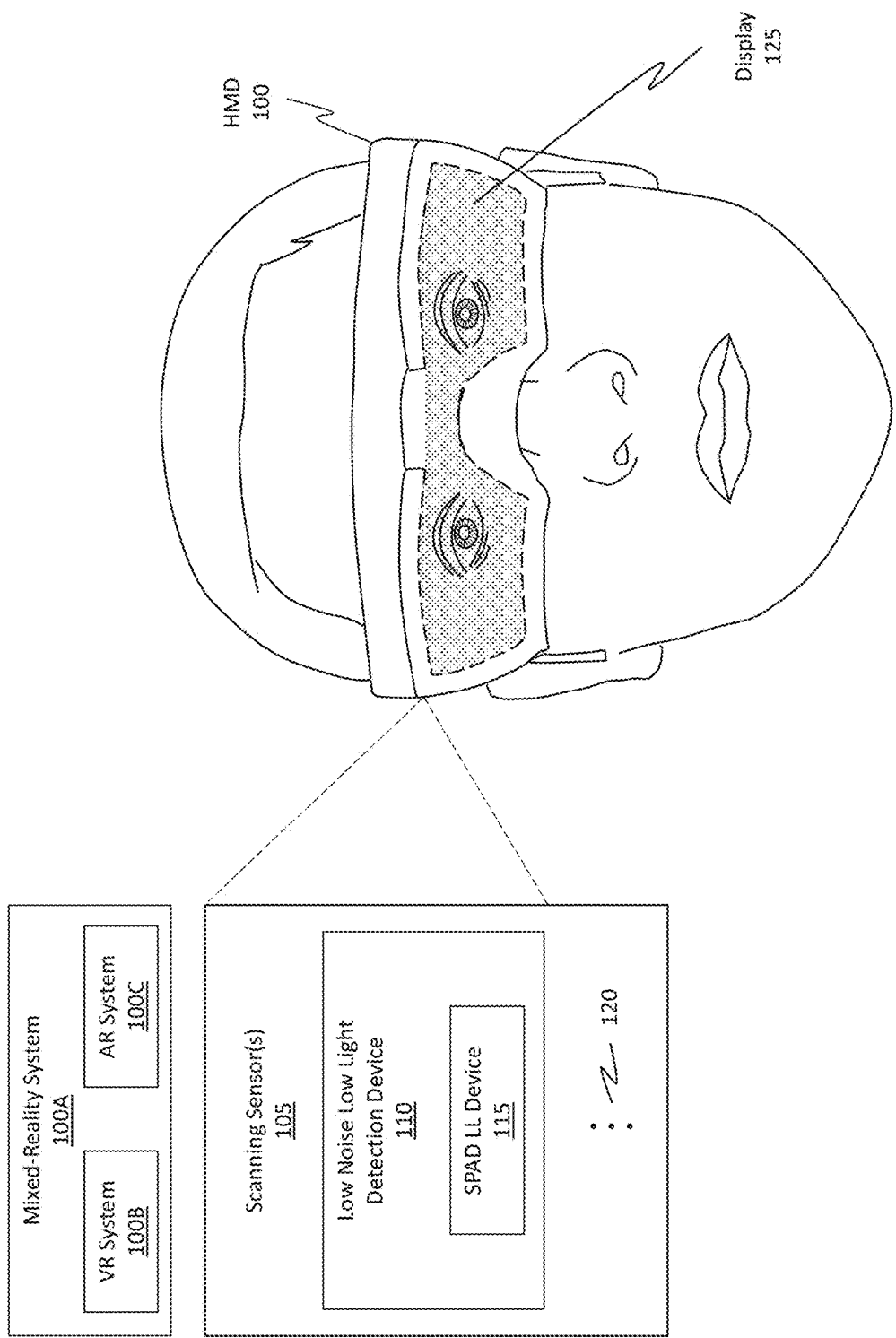
FIG. 1 illustrates an example of a head mounted device HMD (aka MR system).

Embodiments disclosed herein relate to systems, devices (e.g., wearable devices, head mounted devices, hardware storage devices), and methods for providing an illumination system that provides illumination into an environment while also being undetectable to other systems.

Some embodiments include a single photon avalanche diode (SPAD) low light (LL) detection device and a light emitting device. The light emitting device provides illumination having a wavelength of at least 950 nanometers (nm). An intensity of the illumination is set to a level that causes the illumination to be undetectable at a determined distance away. While the light emitting device is providing the illumination, the SPAD LL detection device generates an image of an environment in which the illumination is being provided.

Some embodiments are configured to dynamically modify an amount of illumination generated by an illumination source to achieve or satisfy a particular performance level while also being undetectable by external light detection systems that are of a certain type and/or that are beyond a certain distance away. To do so, some embodiments detect an amount of ambient light in an environment. The embodiments also select a distance away (e.g., from the computer system), where the selected distance is a distance that illumination light will be undetectable by an external light detection system. Based on a feedback loop, the embodiments progressively increase, decrease, or perhaps maintain the amount of illumination light until a threshold level is reached. The threshold level is based on a combination of a roll off rate of the illumination light and the selected distance such that, when the threshold level is reached, the low noise low light detection device is able to detect content up to the selected distance away but not beyond the selected distance as a result of the illumination light rolling off.

Some embodiments include a single photon avalanche diode (SPAD) low light (LL) detection device and a light emitting device. The light emitting device provides illumination light having a wavelength of at least 950 nanometers (nm). An intensity of the illumination light is set to a level that causes the light to be undetectable at or from a determined distance away from the computer system. While the light emitting device is providing the illumination light, the SPAD LL detection device generates an image of the environment. A new distance is selected, where the new distance is a distance that the light will be undetectable by external light detection systems based on the roll off rate of the illumination light. Based on a feedback loop that uses the SPAD LL detection device, the embodiments progressively increase, decrease, or perhaps maintain the amount of illumination light until a threshold level is reached. The threshold level is based on a combination of the roll off rate and the selected new distance such that, when the threshold level is reached, the SPAD LL detection device is able to detect content up to the selected new distance away but not beyond the selected new distance as a result of the illumination light rolling off.

Examples of Technical Benefits, Improvements, And Practical Applications

The following section outlines some example improvements and practical applications provided by the disclosed embodiments. It will be appreciated, however, that these are just examples only and that the embodiments are not limited to only these improvements.

The disclosed embodiments bring about substantial benefits to the technical field. By way of example, the embodiments are able to maintain or achieve/satisfy a desired level of performance (e.g., by generating high quality images in low light environments) while also being undetectable by external light detection systems, such as other MR systems. By following the disclosed principles, the embodiments are able to improve the user's experience with the MR system (e.g., by being undetectable) while also providing that user with high quality imagery. In doing so, improved analytics, computer vision, and user interaction with the computer system are achieved. Furthermore, the user (in some instances) is provided with content that he/she potentially would not be able to view or interact with otherwise. Accordingly, these and other benefits will be described in more detail throughout the remaining portion of this disclosure.

Example HMDs & Scanning Systems

Attention will now be directed to FIG. 1, which illustrates an example of a head-mounted device (HMD) 100. HMD 100 can be any type of MR system 100A, including a VR system 100B or an AR system 100C. It should be noted that while a substantial portion of this disclosure is focused on the use of an HMD to scan an environment to provide a passthrough visualization (aka passthrough image), the embodiments are not limited to being practiced using only an HMD. That is, any type of scanning system can be used, even systems entirely removed or separate from an HMD. For example, a self-driving car can implement the disclosed operations.

Consequently, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualization of the user's environment. A "passthrough" visualization refers to a visualization that reflects what the user would see if the user were not wearing the HMD 100, regardless of whether the HMD 100 is included as a part of an AR system or a VR system, though that passthrough image may be supplemented with additional or enhanced content. To generate this passthrough visualization, the HMD 100 may use its scanning sensor(s) 105 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique.

To convert a raw image into a passthrough image, the scanning sensor(s) 105 typically rely on its cameras (e.g., head tracking cameras, hand tracking cameras, depth cameras, or any other type of camera) to obtain one or more raw images of the environment. In addition to generating passthrough images, these raw images may also be used to determine depth data detailing the distance from the sensor to any objects captured by the raw images (e.g., a z-axis range or measurement). Once these raw images are obtained, then passthrough images can be generated (e.g., one for each pupil), and a depth map can also be computed from the depth data embedded or included within the raw images.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated.

Relatedly, from the passthrough visualizations, a user will be able to perceive what is currently in his/her environment without having to remove or reposition the HMD 100. Furthermore, as will be described in more detail later, the disclosed passthrough visualizations will also enhance the user's ability to view objects within his/her environment (e.g., by displaying additional environmental conditions that may not have been detectable by a human eye).

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include a low noise low light detection device 110, such as a single photon avalanche diode (SPAD) low light (LL) device 115. The ellipsis 120 indicates how other types of scanning sensors can also be included in the HMD 100, such as, for example, visible light camera(s), other types of low light camera(s), thermal imaging camera(s), ultraviolet (UV) cameras, monochrome cameras, infrared camera(s), depth cameras, time of flight cameras, and so on. In this regard, cameras of different modalities can optionally be included on the HMD 100. The scanning sensor(s) 105 generate images, which may be used to generate passthrough images, which may then be displayed on a display 125 of the HMD 100.

In contrast to traditional image intensifier tubes used in low light detection devices, a SPAD is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected) or a "0" where no avalanche event was detected.

Separate shutter operations may be integrated over a frame capture time period (e.g., a 30 Hz time period or some other framerate). The binary output of the shutter operations over a frame capture time period may be counted, and an intensity value may be calculated based on the counted binary output. Stated differently, separate gates can be regarded as "subframes" or "subgates," and consecutive subframes can be integrated over a frame capture time period (e.g., a 30 Hz time period or some other framerate). The binary output of the subframes over a frame capture time period can be counted, and an intensity value can be calculated based on the counted binary output.

An array of SPADs can form an image sensor, with each SPAD forming a separate pixel in the SPAD array. To capture an image of an environment, each SPAD pixel can detect avalanche events and provide binary output for consecutive shutter operations in the manner described herein. The per-pixel binary output of multiple shutter operations over a frame capture time period can be counted, and per-pixel intensity values can be calculated based on the counted per-pixel binary output. The per-pixel intensity values can be used to form an intensity image of an environment.

SPAD image sensors may provide a number of advantages over conventional image intensifier tubes/sensors. For example, the binarization of the SPAD output can reduce or effectively eliminate read noise, thereby improving the signal-to-noise ratio for SPAD image sensor arrays as compared with conventional image intensifier tubes/sensors, particularly under low light imaging conditions. Thus, SPAD sensors can be usable on HMDs to facilitate image capture as well as other tasks (e.g., depth sensing and/or other functions that depend on depth information), especially under low light imaging conditions where conventional image intensifier tubes/sensors would experience a poor signal-to-noise ratio.

Furthermore, as described herein, SPAD arrays can be configured to perform interleaved active imaging operations (e.g., time-of-flight capture) and passive imaging operations (e.g., intensity image capture) in an advantageous manner. Such functionality can provide significant advantages over conventional image intensifier tubes/sensors. For example, where an image intensifier tube/sensor is used to capture both intensity image information and depth information using time-of-flight techniques, the sensor may alternate between capturing a full intensity frame and capturing a full depth frame. However, such techniques result in a temporal offset between the intensity frames and the depth frames. Such temporal offsets may cause motion blur in parallax-corrected images and/or other problems for other operations that rely on or benefit from temporally aligned intensity and depth information describing a captured environment.

In contrast to conventional systems, the disclosed SPAD arrays are configured to perform interleaved intensity image capture operations and time-of-flight capture operations at the sub-frame level. For example, over a frame capture time period, a SPAD array may alternate between collecting intensity information (e.g., counting subframes or subgates for which a photon was detected) and collecting depth information (e.g., pulsing a laser and tracking differently delayed subframes or subgates for which a photon was detected) with sub-frame timing. Such functionality may provide frames that comprise intensity information and depth information that are temporally aligned (e.g., a composited three-dimensional image and intensity image), thereby reducing or eliminating motion blur in parallax-corrected pass-through images and/or improving other operations that benefit from temporally aligned intensity and depth information.

In contrast with conventional image intensifier tubes/sensors, techniques for performing interleaved intensity capture and time-of-flight capture operations with sub-frame timing may be implemented using SPAD arrays. For example, attempting to implement such techniques using conventional image intensifier tubes/sensors may cause a low signal-to-noise ratio (e.g., by increasing the effect of read noise).

It should be noted that any number of cameras (e.g., SPAD LL Detection devices) may be provided on the HMD 100 for each of the different camera types/modalities. That is, the SPAD LL detection devices may include 1, 2, 3, 4, 5, 6, 7, 8, 9, 10, or more than 10 cameras/devices. Often, however, the number of cameras is at least 2 so the HMD 100 can perform stereoscopic depth matching. Similarly, the other types of camera (e.g., low light camera(s), thermal imaging camera(s), UV camera(s), monochrome cameras, and infrared camera(s)) may each respectively include 1, 2, 3, 4, 5, 6, 7, 8, 9, 10, or more than 10 corresponding cameras.

Figure 2:
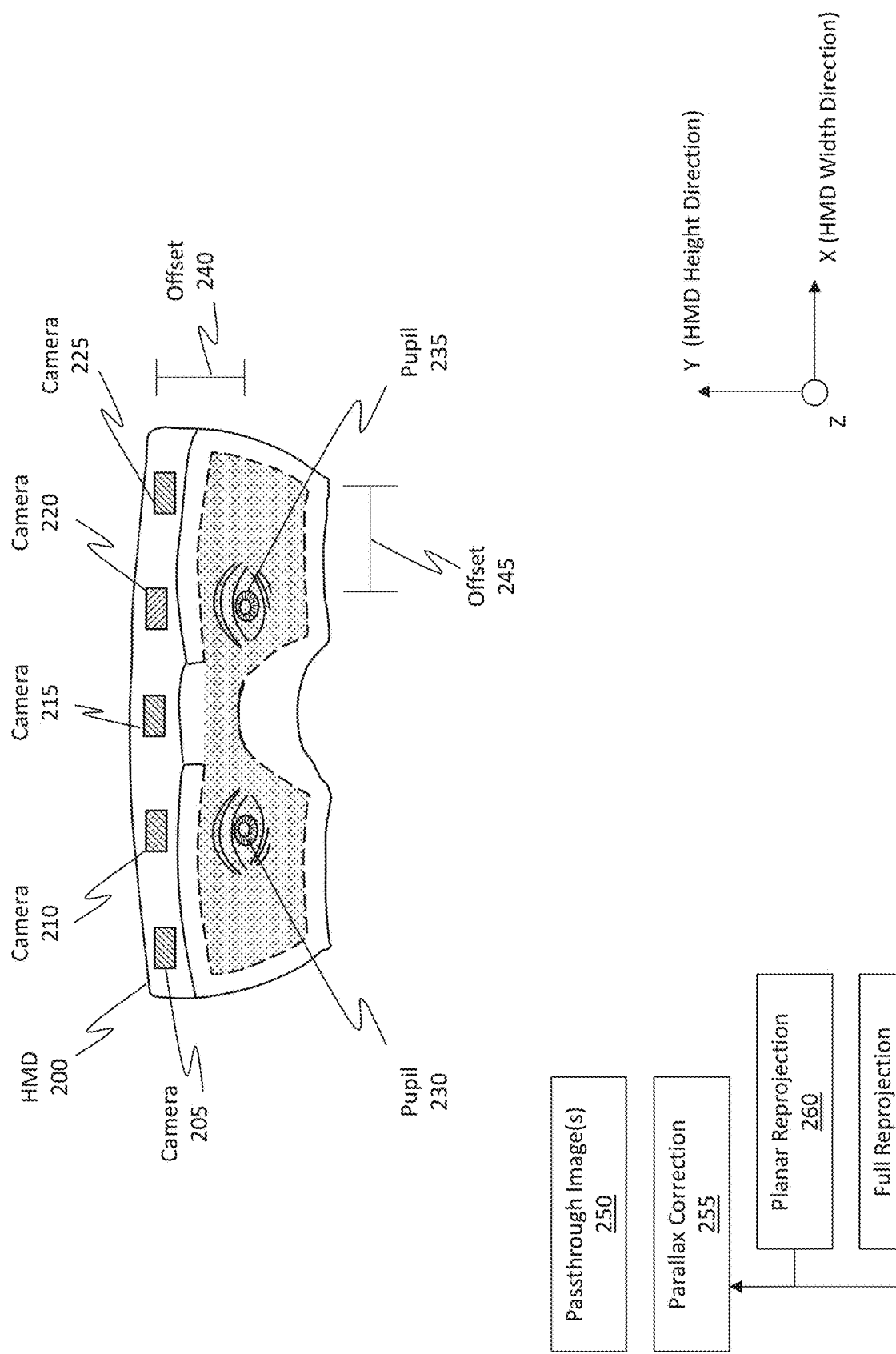
FIG. 2 illustrates how different cameras can be incorporated into the MR system.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the SPAD LL detection devices, visible light camera(s), low light camera(s), thermal imaging camera(s), UV camera(s), monochrome cameras, and infrared camera(s). While only 5 cameras are illustrated in FIG. 2, HMD 200 may include more or less than 5 cameras.

In some cases, the cameras can be located at specific positions on the HMD 200. For instance, in some cases a first camera (e.g., perhaps camera 220) is disposed on the HMD 200 at a position above a designated left eye position of any users who wear the HMD 200 relative to a height direction of the HMD. For instance, the camera 220 is positioned above the pupil 235. As another example, the first camera (e.g., camera 220) is additionally positioned above the designated left eye position relative to a width direction of the HMD. That is, the camera 220 is positioned not only above the pupil 235 but also in-line relative to the pupil 235. When a VR system is used, a camera may be placed directly in front of the designated left eye position. For example, with reference to FIG. 2, a camera may be physically disposed on the HMD 200 at a position in front of the pupil 235 in the z-axis direction.

When a second camera is provided (e.g., perhaps camera 210), the second camera may be disposed on the HMD at a position above a designated right eye position of any users who wear the HMD relative to the height direction of the HMD. For instance, the camera 210 is above the pupil 230. In some cases, the second camera is additionally positioned above the designated right eye position relative to the width direction of the HMD. When a VR system is used, a camera may be placed directly in front of the designated right eye position. For example, with reference to FIG. 2, a camera may be physically disposed on the HMD 200 at a position in front of the pupil 230 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

As described earlier, HMD 200 is configured to provide passthrough image(s) 250 for the user of HMD 200 to view. In doing so, HMD 200 is able to provide a visualization of the real world without requiring the user to remove or reposition HMD 200. Sometimes, the visualization is enhanced, modified, or supplemented with additional information, as will be described in more detail later. The passthrough image(s) 250 effectively represent the same view the user would see if the user were not wearing HMD 200. Cameras 205-225 are used to provide these passthrough image(s) 250.

None of the cameras 205-225, however, are directly aligned with the pupils 230 and 235. The offsets 240 and 245 actually introduce differences in perspective as between the cameras 205-225 and the pupils 230 and 235. These perspective differences are referred to as "parallax."

Because of the parallax occurring as a result of the offsets 240 and 245, raw images produced by the cameras 205-225 are not available for immediate use as passthrough image(s) 250. Instead, it is beneficial to perform a parallax correction 255 (aka an image synthesis) on the raw images to transform the perspectives embodied within those raw images to correspond to perspectives of the user's pupils 230 and 235. The parallax correction 255 includes any number of distortion corrections (e.g., to correct for concave or convex wide or narrow angled camera lenses), epipolar transforms (e.g., to parallelize the optical axes of the cameras), and/or reprojection transforms (e.g., to reposition the optical axes so as to be essentially in front of or in-line with the user's pupils). The parallax correction 255 may include performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

In some cases, the parallax correction 255 includes a planar reprojection 260 where all pixels of an image are reprojected to a common planar depth. In some cases, the parallax correction 255 includes a full reprojection 265 where various pixels are reprojected to different depths.

By performing these different transforms or reprojections, the embodiments are optionally able to perform three-dimensional (3D) geometric transforms on the raw camera images to transform the perspectives of the raw images in a manner so as to correlate with the perspectives of the user's pupils 230 and 235. Additionally, the 3D geometric transforms rely on depth computations in which the objects in the HMD 200's environment are mapped out to determine their depths. Based on these depth computations, the embodiments are able to three-dimensionally reproject or three-dimensionally warp the raw images in such a way so as to preserve the appearance of object depth in the passthrough image(s) 250, where the preserved object depth substantially matches, corresponds, or visualizes the actual depth of objects in the real world. Accordingly, the degree or amount of the parallax correction 255 is at least partially dependent on the degree or amount of the offsets 240 and 245.

By performing the parallax correction 255, the embodiments effectively create "virtual" cameras having positions that are in front of the user's pupils 230 and 235. By way of additional clarification, consider the position of camera 205, which is currently above and to the left of the pupil 230. By performing the parallax correction 255, the embodiments programmatically transform images generated by camera 205, or rather the perspectives of those images, so the perspectives appear as though camera 205 were actually positioned immediately in front of pupil 230. That is, even though camera 205 does not actually move, the embodiments are able to transform images generated by camera 205 so those images have the appearance as if camera 205 were positioned in front of pupil 230.

Light Emitting Devices

Figure 3:
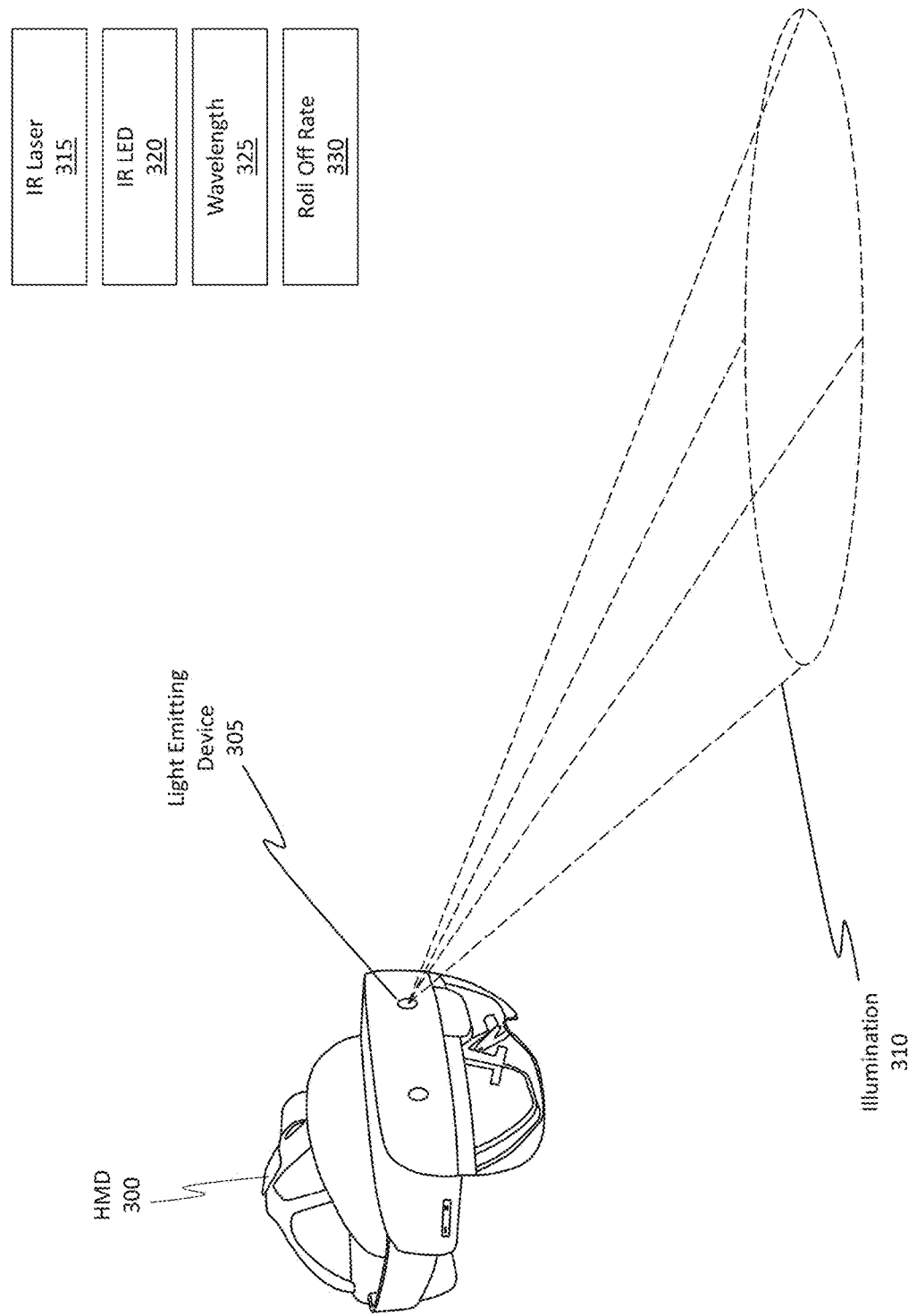
FIG. 3 illustrates how the MR system can include a light emitting device.

FIG. 3 shows an example HMD 300, which is representative of the HMDs and MR systems discussed thus far. HMD 300 includes a light emitting device 305 that is shown as emitting illumination 310 (aka light or illumination light). The light emitting device 305 can take on various different forms.

For example, in some cases, the light emitting device 305 can be an infrared (IR) laser 315 that is configured to emit highly coherent light. In some cases, the light emitting device 305 can be an IR light emitting diode (LED) 320.

Figure 4:
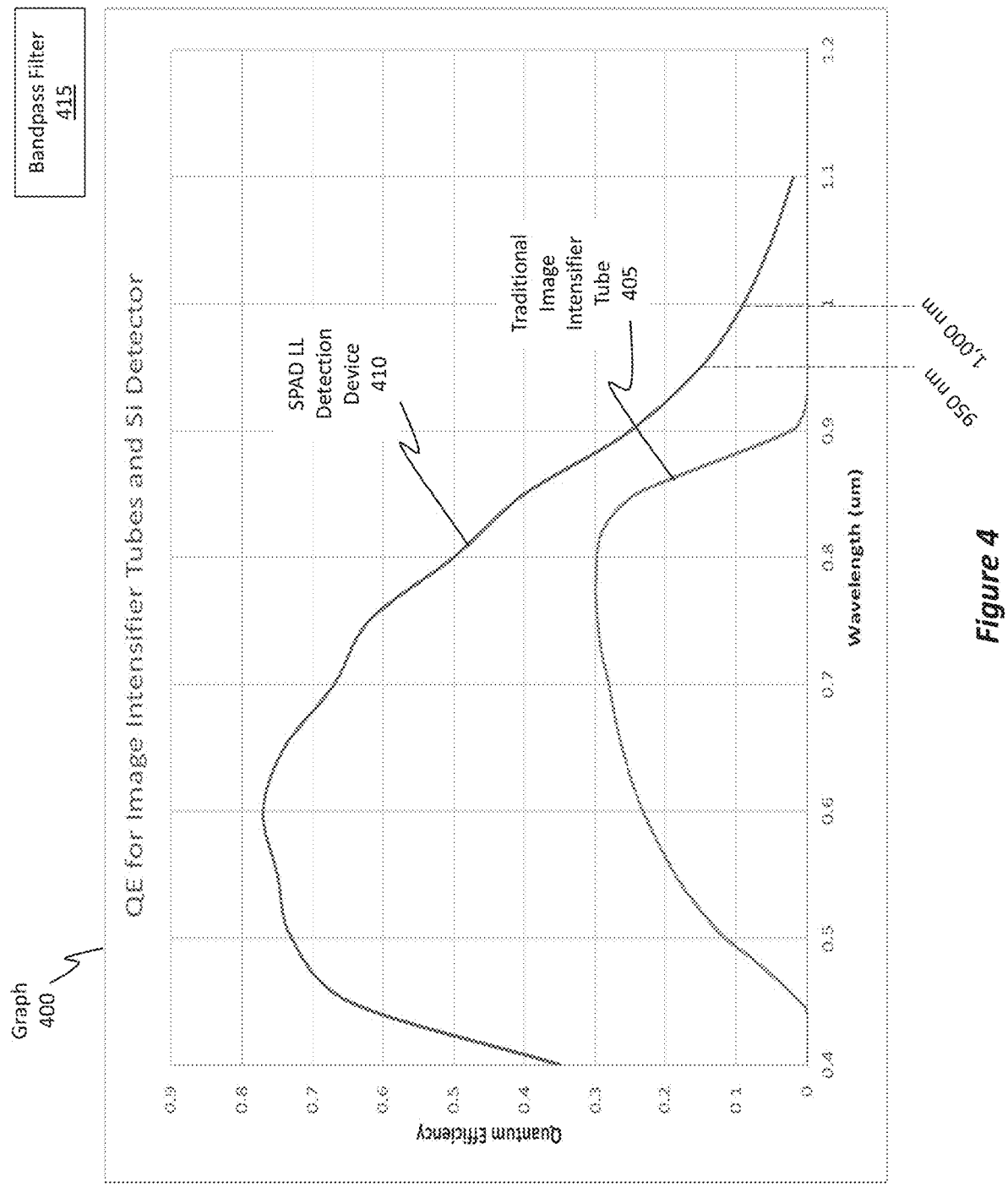
FIG. 4 illustrates different quantum energy plots for different types of light detection devices, including a traditional image intensifier tube and a single photon avalanche diode (SPAD) device.
Figure 5:
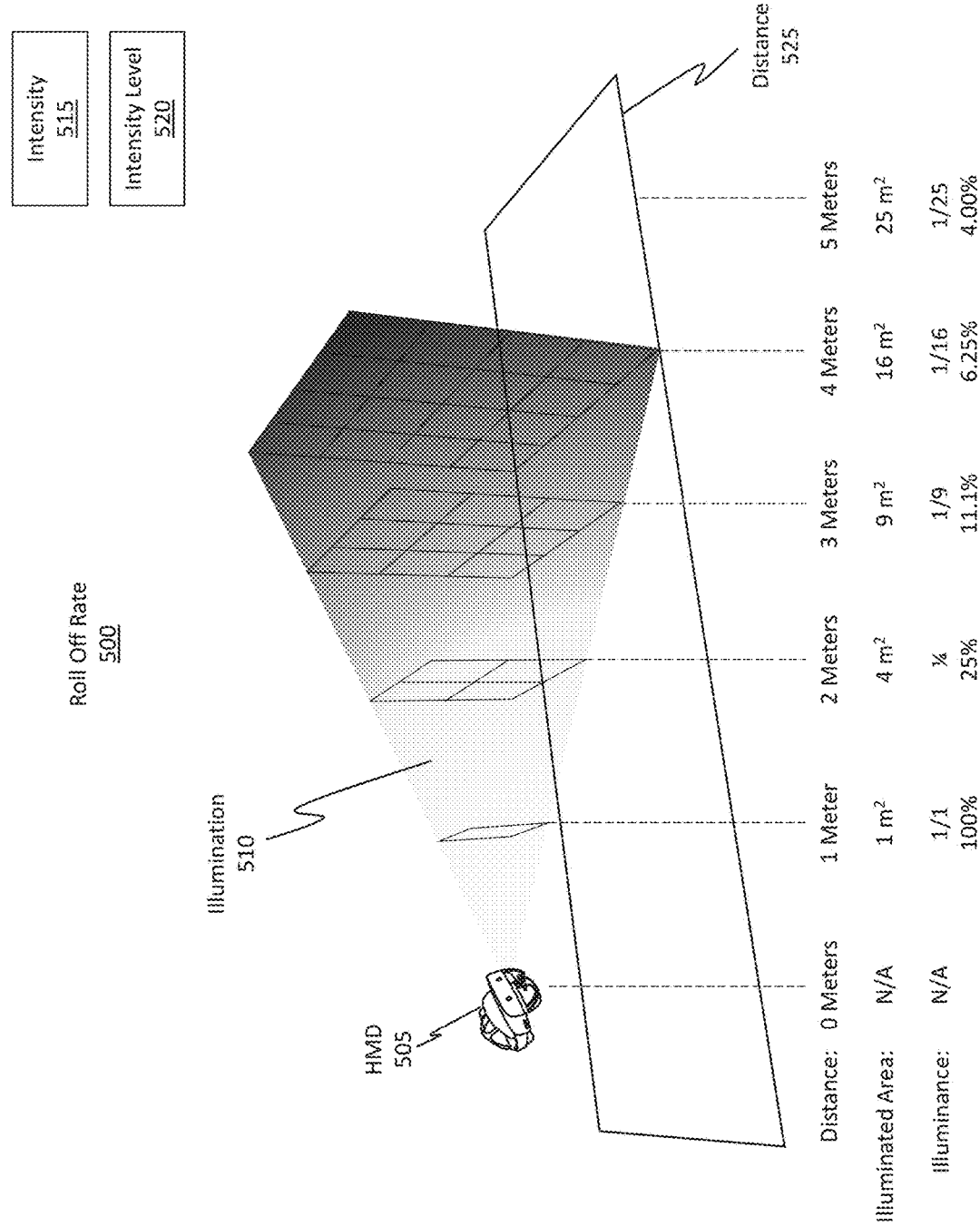
FIG. 5 illustrates the roll off rate of light.
Figure 6:
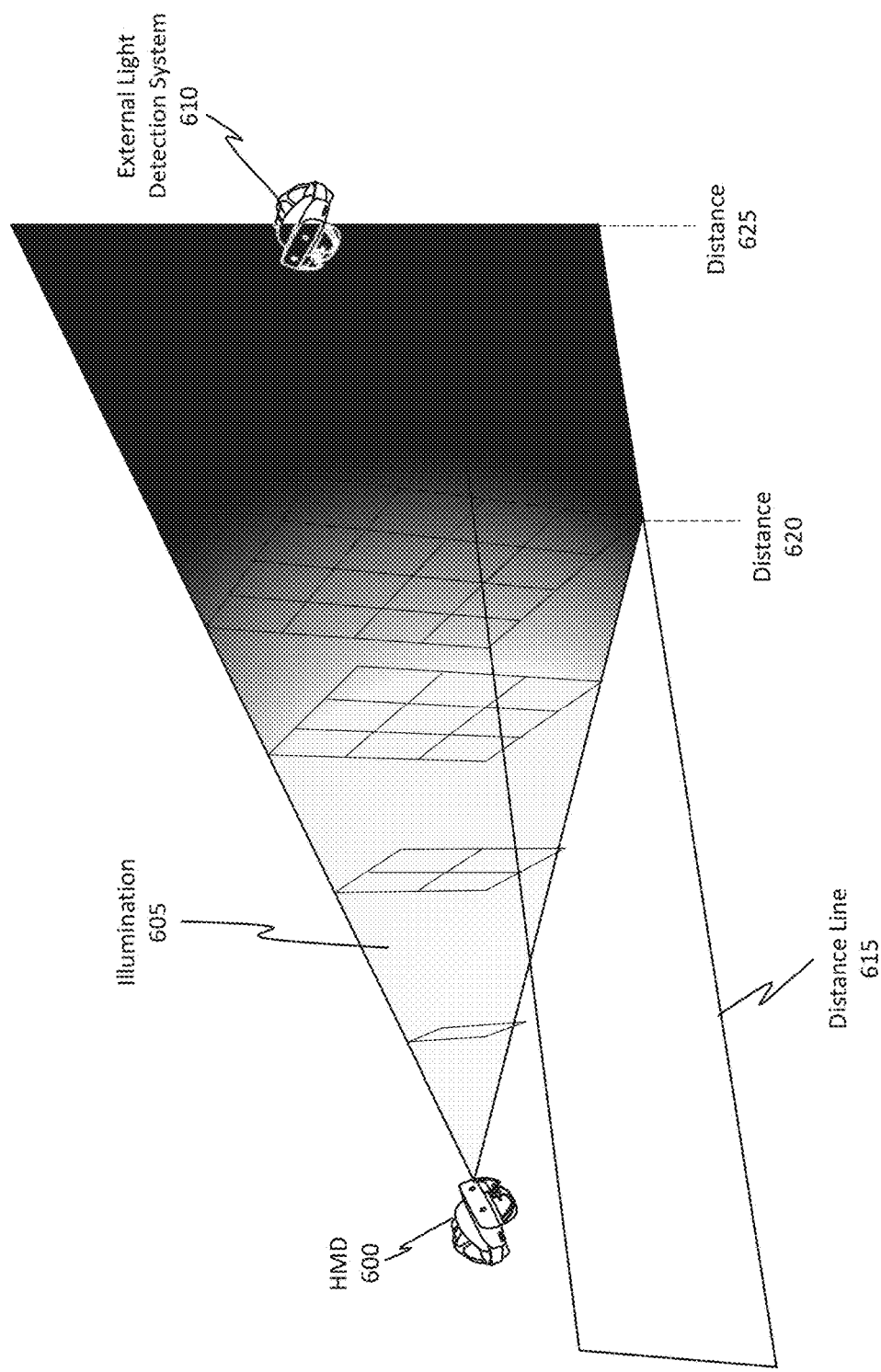
FIG. 6 illustrates how, even though a first MR system might be emitting illumination light, if a second MR system is located at a distance where the roll off rate of the emitted light results in too few photons reaching that second MR system, then the first MR system will be undetectable by the second MR system.

In accordance with the disclosed principles, the light emitting device 305 is configured to emit light having a particular wavelength 325 or within a range of wavelengths, as will be discussed in more detail shortly. Furthermore, one will appreciate how the illumination 310 has a particular roll off rate 330. That is, the roll off rate 330 of light is $1/R^2$, where "R" is the distance away from the light emitting device 305. FIGS. 4, 5, and 6 provide additional details.

FIG. 4 shows a graph 400 that has two plots on it. One plot maps out the quantum efficiency curve for a traditional image intensifier tube 405 used in traditional low light detection devices. The other plot maps out the quantum efficiency curve for a SPAD LL detection device 410 used by the disclosed embodiments.

Notice, the quantum efficiency curve drops off significantly for the traditional image intensifier tube 405 at around 900 nanometers (nm). What this means is that a traditional image intensifier tube, which is used in traditional low light detection devices, is unable to detection light having wavelengths above about 900 nm.

In contrast, the quantum efficiency curve for the SPAD LL detection device 410 does not drop off until wavelengths reach about 1,100 nm. What this means is that a SPAD LL detection device can detect light at wavelengths where a traditional image intensifier tube will not be able to detect light, such as for wavelengths between about 900 nm and 1,100 nm.

As discussed earlier, it is desirable to provide a system that is undetectable by other types of systems. Therefore, in accordance with the disclosed principles, the embodiments are able to utilize a SPAD LL detection device in combination with a light emitting device. The light emitting device is configured to emit light having wavelengths that are undetectable to traditional image intensifier tubes. In some cases, a buffer region is established. For instance, because traditional image intensifier tubes might be able to detect light around 900 nm, a buffer of about 50 nm can be implemented so that the disclosed light emitting devices emit light having wavelengths above about 950 nm, but not below 950 nm.

In some implementations, the MR system can be equipped with a bandpass filter 415 to help filter out light near the threshold level of about 950 nm. That is, the bandpass filter 415 can be configured to filter out light having wavelengths below about 950 nm. By using this bandpass filter 415, the embodiments are able to maintain or preserve a desired buffer between the wavelengths that are detectable by traditional image intensifier tubes and wavelengths that will be detected by the SPAD LL detection devices.

As mentioned previously, light has a particular roll off rate. FIG. 5 provides a useful illustration about this roll off rate.

Specifically, FIG. 5 shows a roll off rate 500 for light that is emitted by an HMD 505, as shown by illumination 510. That is, HMD 505 is representative of the HMD 300 from FIG. 3, and the illumination 510 is representative of the illumination 310.

The illumination 510 has a particular intensity 515 and the intensity level 520 of that illumination 510 can be modified based on the amount of power provided to the light emitting device. The roll off rate 500 shown by FIG. 5 illustrates how, as the distance 525 away from the HMD 505 (or rather, the light emitting device) increases, the illumination 510 dissipates or rolls off at a rate of $1/R^2$.

For instance, at 1 meter (m) away from the HMD 505, the illuminated area is 1 $m^2$, and the illuminance is 1/1, or 100%. At 2 m away from the HMD 505, the illuminated area is 4 $m^2$, and the illuminance is ¼, or 25%. At 3 m away from the HMD 505, the illuminated area is 9 $m^2$, and the illuminance is ⅑, or 11.1%. At 4 m away from the HMD 505, the illuminated area is 16 $m^2$, and the illuminance is 1/16, or 6.25%. At 5 m away from the HMD 505, the illuminated area is 25 $m^2$, and the illuminance is 1/25, or 4.0%. Based on this illustration, one can observe how light falls off, or dissipates, at a quick rate. If the distance is far enough away from the HMD 505, then the amount of light that reaches that distance will be so minimal that the light will essentially be undetectable. Such a scenario is shown in FIG. 6.

FIG. 6 shows an HMD 600 emitting illumination 605, similar to that which was shown in FIG. 5. FIG. 6 also shows an external light detection system 610, which may be an HMD/MR system, a camera, or any other type of light detection device. FIG. 6 also shows a distance line 615, which generally reflects the roll off rate of the illumination 605. At or from distance 620, the illumination 605 appears to be quite dark and is nearly imperceptible. Notice, the external light detection system 610 is located at distance 625, which is even farther away from the HMD 600 than the distance 620. Because the distance 625 is so great, the photons that are being emitted by the HMD 600 have dispersed so much that those photons are essentially undetectable, as shown by the external light detection system 610 being in a black or darkened area.

With that understanding, one can appreciate how, by dynamically controlling both the wavelength of light as well as the intensity of light, it is possible to design a system that meets, achieves, or satisfies certain performance requirements/objectives while, at the same time, being undetectable to external light detection systems. Further details will be provided later, but a quick introduction is warranted. In particular, the embodiments are able to emit light having a wavelength that is selected so as to not be detectable by traditional image intensifier tubes. The amount of light that is emitted can be dynamically adjusted based on a feedback loop that takes into consideration multiple different criteria. Further details on this feedback loop will be provided later. The amount of light that is emitted is often quite low. For instance, the amount of light is often in the range from about 0.01 millilux to about 5.0 millilux; though less than 0.01 millilux can be emitted or more than 5.0 millilux can be emitted.

The embodiments are able to dynamically control the intensity of the emitted light so that external light detection systems that are a particular distance away will not be able to detect the emitted light, even if that external light detection system uses traditional image intensifier tubes or SPAD LL detection devices. As will be discussed in more detail later, the embodiments employ a feedback loop designed to dynamically control the intensity of the light to achieve an undetected state.

MR System Configurations

Figure 7:
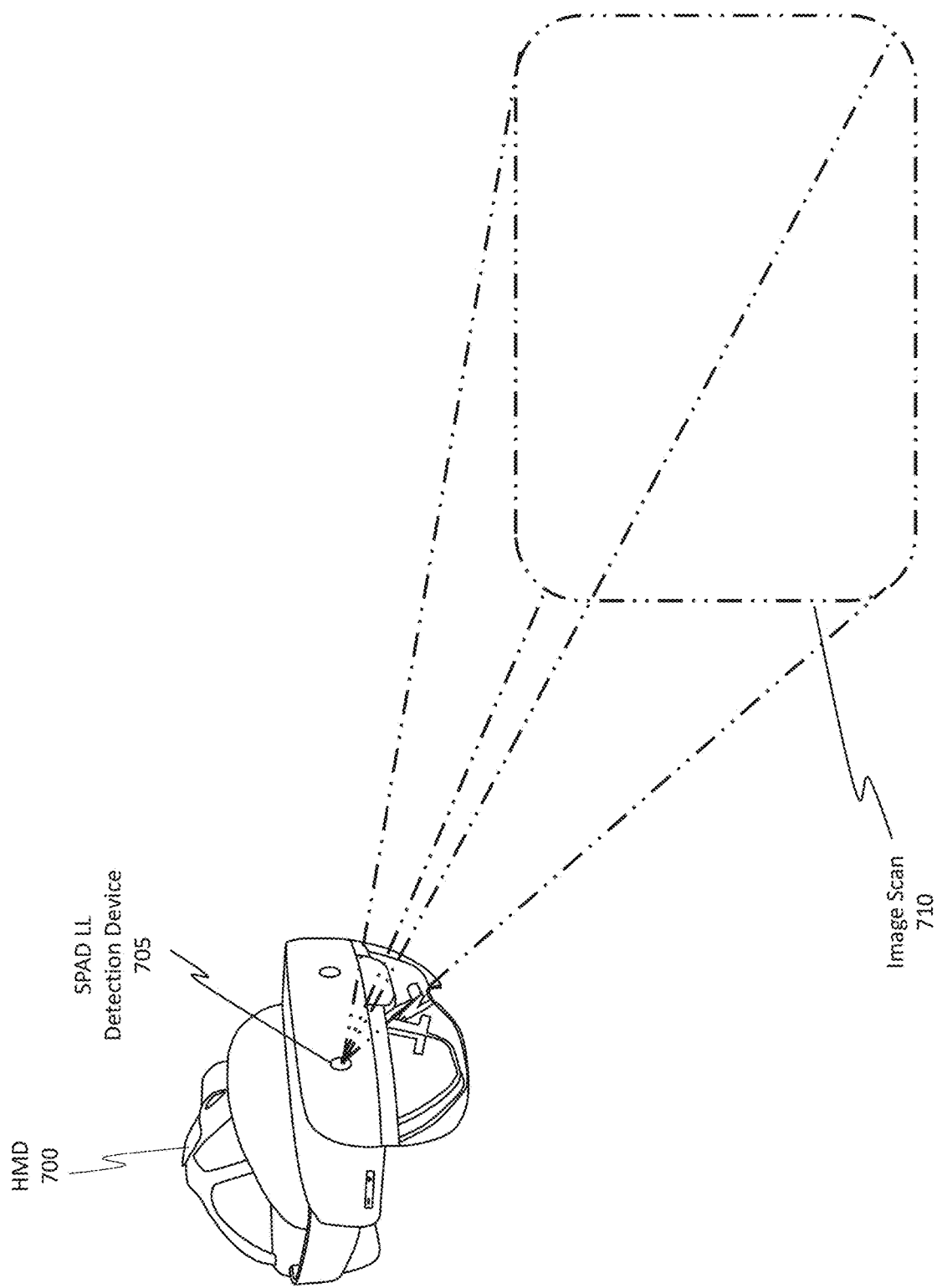
FIG. 7 illustrates how the MR system can include a SPAD low light (LL) detection device.

Having just described various characteristics of light, attention will now be directed to FIG. 7, which shows an example HMD 700 that includes a SPAD LL detection device 705. Here, the SPAD LL detection device 705 is being used to capture an image of an environment, as shown by image scan 710. That image can be used as a passthrough image, as was discussed earlier.

Figure 8:
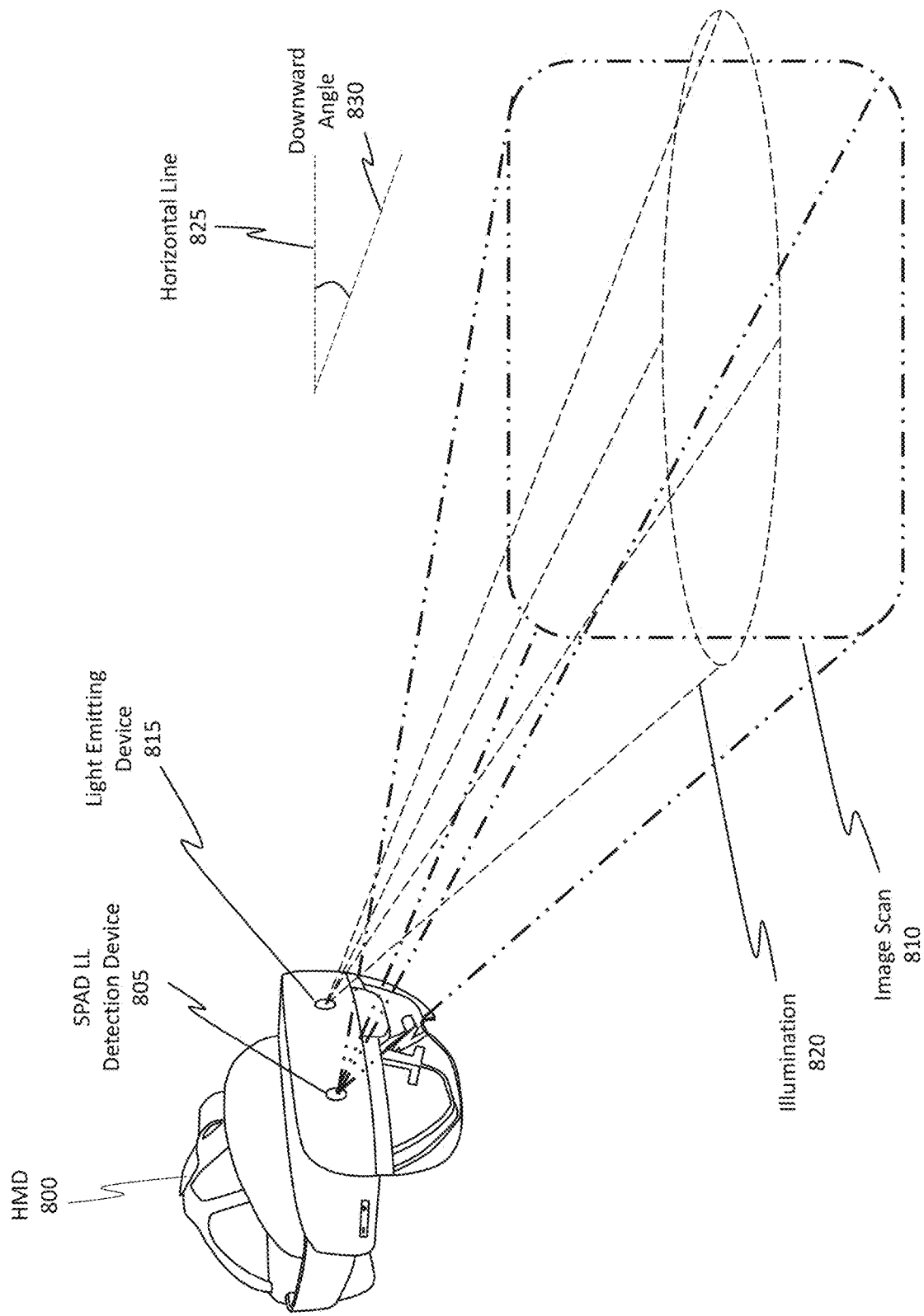
FIG. 8 illustrates how the MR system can include a combination of a SPAD LL detection device and a light emitting device.

FIG. 8 shows an HMD 800, which is representative of the HMDs discussed thus far. HMD 800 includes a SPAD LL detection device 805, which is being used to capture an image of an environment (as shown by image scan 810), and a light emitting device 815, which is being used to emit illumination 820 into the environment. The light emitting device 815 is configured in the manner discussed earlier in that it emits light having a wavelength above about 900 nm. In most cases, the illumination 820 has a wavelength above about 950 nm. In some cases, the illumination 820 has a wavelength above about 1,000 nm. As discussed earlier, a bandpass filter can be used to filter light having wavelengths below about 950 nm.

In this example scenario, the light emitting device 815 is projecting light into the environment while the SPAD LL detection device 805 is capturing an image of the environment where the light is being emitted. That is, the SPAD LL detection device 805 and the light emitting device 815 are generally aimed in the same direction.

The horizontal line 825 refers to a line that is projected directly outward (e.g., orthogonal) from the HMD 800, akin to an optical axis of a camera. Also shown is a downward angle 830, which can be set to any downward angle between 1 degree and 89 degrees. The light emitting device 815 is aimed to follow the downward angle 830. By aiming the light emitting device 815 downward, the embodiments are able to avoid a so-called "headlight in the distance" scenario. That is, when car headlights are directed along the horizontal line 825, those headlights can often be seen from very far distances, sometimes miles away. By directing headlights downward, however, the light beams strike the ground, thereby avoiding the ability to see the light from far distances. A similar principle is followed with the light emitting device 815 in that the light emitting device 815 is also aimed downward along the downward angle 830.

With the above configuration, the HMD 800 can now be used in extremely low light scenarios. Such scenarios occur when the ambient light conditions are around about 1.0 millilux, which is the light levels that occur when only starlight is present in the environment. The light emitting device 815 is configured to emit just enough light photons to enable the SPAD LL detection device 805 to observe content in the environment while also being configured to refrain from emitting too much light photons so that external light detection systems are unable to detect the HMD 800.

Figure 9:
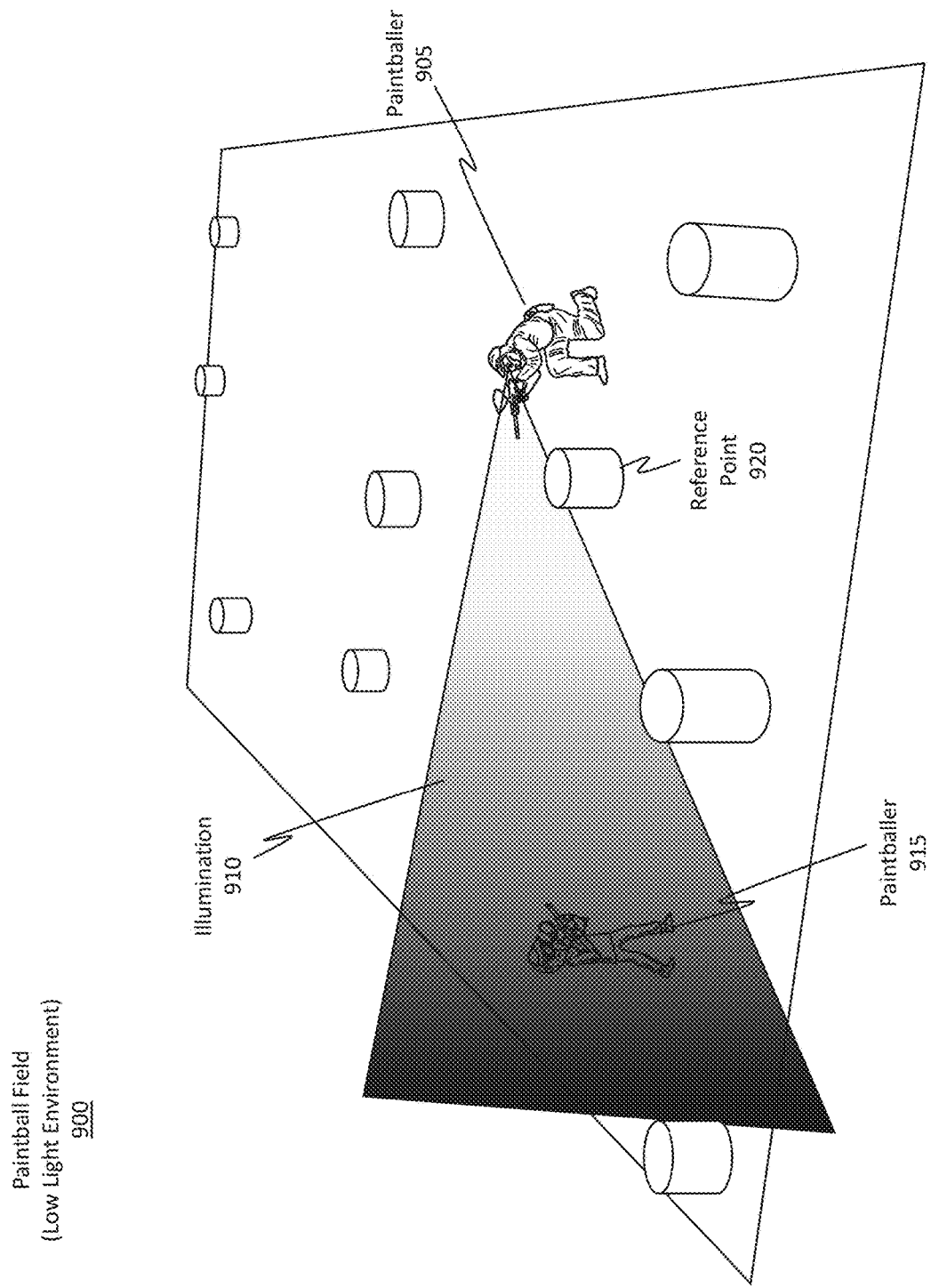
FIG. 9 illustrates how the combination of the SPAD LL detection device and the light emitting device can enable a MR system to detect content while not being detectable by other MR systems.
Figure 10:
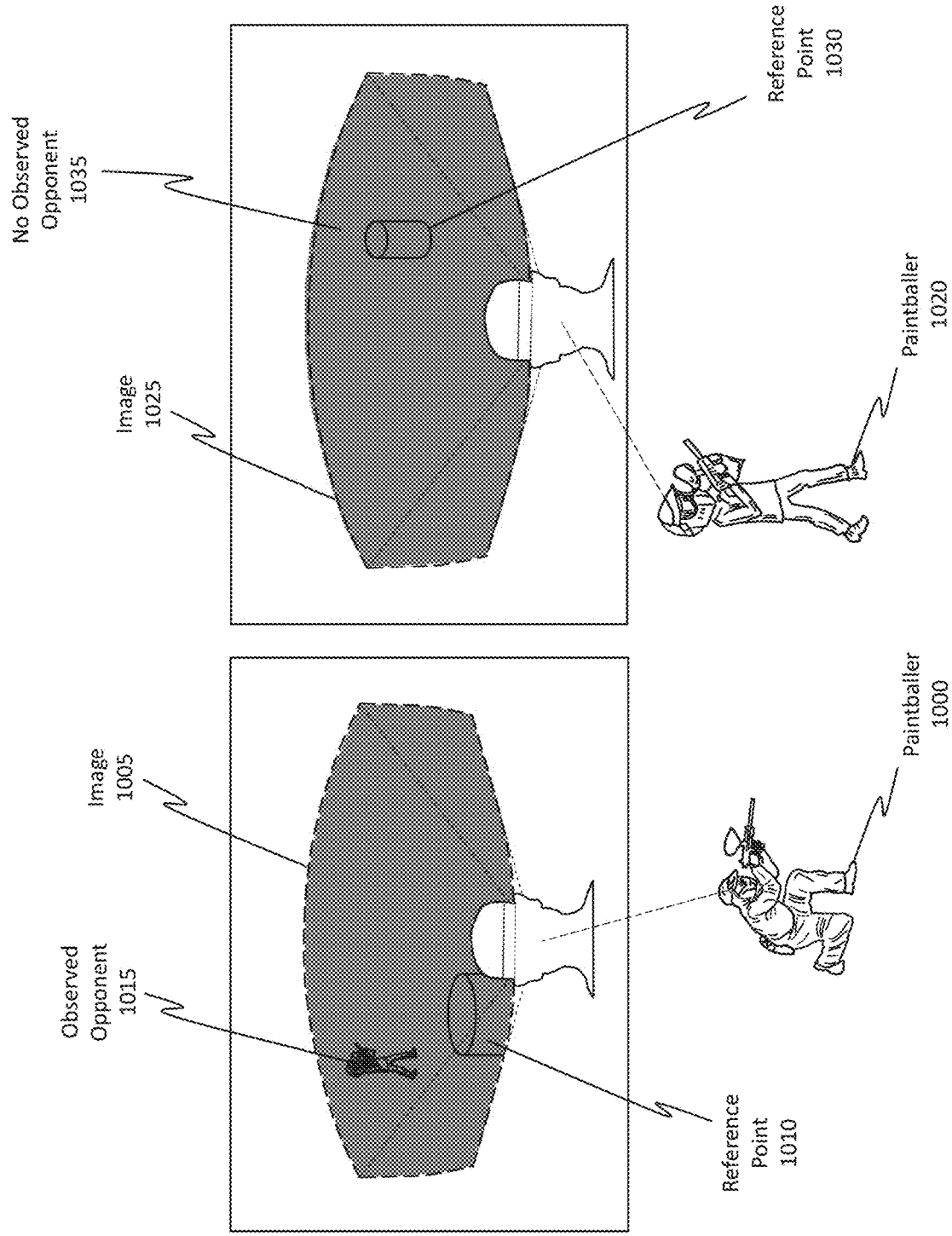
FIG. 10 provides another illustration of how the disclosed systems can detect content while avoiding being detectable by other systems.

That is, the HMD 800 is able to dynamically control the intensity of the illumination 820 to achieve a scenario where the illumination 820 essentially entirely drops off at a particular selected distance. That distance can be set to any value away from the HMD 800. For instance, the selected distance can be from 1 or 2 meters from the HMD 800 to 5 meters away from the HMD 800. By way of additional clarification, the embodiments control the intensity of the illumination 820 so that the illumination 820 drops off at a selected distance (i.e. from that distance, the number of detectable photons from the device are not sufficiently detectable, meaning either the detecting sensors are not able to sense the photons or meaning that any photons that are detected are confused with or are interpreted as being noise). As a consequence, the SPAD LL detection device 805 will be able to observe and detect content up to the selected distance while external light detection devices that are located farther away than the selected distance will not be able to detect or observe the HMD 800 because the illumination 820 has dropped off. FIGS. 9 and 10 provide a useful example.

Examples of Being Undetectable

FIG. 9 illustrates an environment comprising a paintball field 900, which is an example of a low light environment. Notice, there is a paintballer 905 who is wearing a HMD configured in the manner described herein. The HMD is emitting an illumination 910 having the wavelength features recited above. The HMD also includes a SPAD LL detection device configured to generate low light images of the environment. The paintball field 900 also includes a second paintballer 915 who is currently standing in the area illuminated by the illumination 910.

In this scenario, the paintballer 905 will be able to see the paintballer 915 because the paintballer 915 is in the range of the illumination 910. If the paintballer 915 does not have an HMD or if that HMD includes traditional image intensifier tubes, then the paintballer 915 will not be able to see the paintballer 905 because the illumination 910 has undetectable wavelengths.

FIG. 9 also shows a reference point 920, which is an example of an obstacle placed in the paintball field 900. The reference point 920 will be referred to in the next few figures.

FIG. 10 shows the images that each of the paintballers in FIG. 9 are able to see. Specifically, FIG. 10 shows a paintballer 1000, who represents the paintballer 905. FIG. 10 shows an image 1005, which may be an example of a passthrough image that is provided to the paintballer 1000. Notice, the image 1005 shows the reference point 1010, which is representative of the reference point 920 from FIG. 9, as well as the observed opponent 1015, who is representative of the paintballer 915.

FIG. 10 also shows a paintballer 1020, who is representative of the paintballer 915 from FIG. 9. FIG. 10 further shows an image 1025, which may be a passthrough image that the paintballer 1020 is viewing. Notice, the image 1025 shows the reference point 1030, but the paintballer 1000 is not detectable, as shown by no observed opponent 1035. In this example scenario, the paintballer 1020 is using an HMD that relies on traditional image intensifier tubes, and that system is not sufficient to detect the illumination 910 from FIG. 9. Furthermore, the paintballer 905 is too far removed from the paintballer 915 such that the image 1025 does not display the paintballer 905. Accordingly, by using the disclosed principles, substantial benefits may be achieved.

Figure 11:
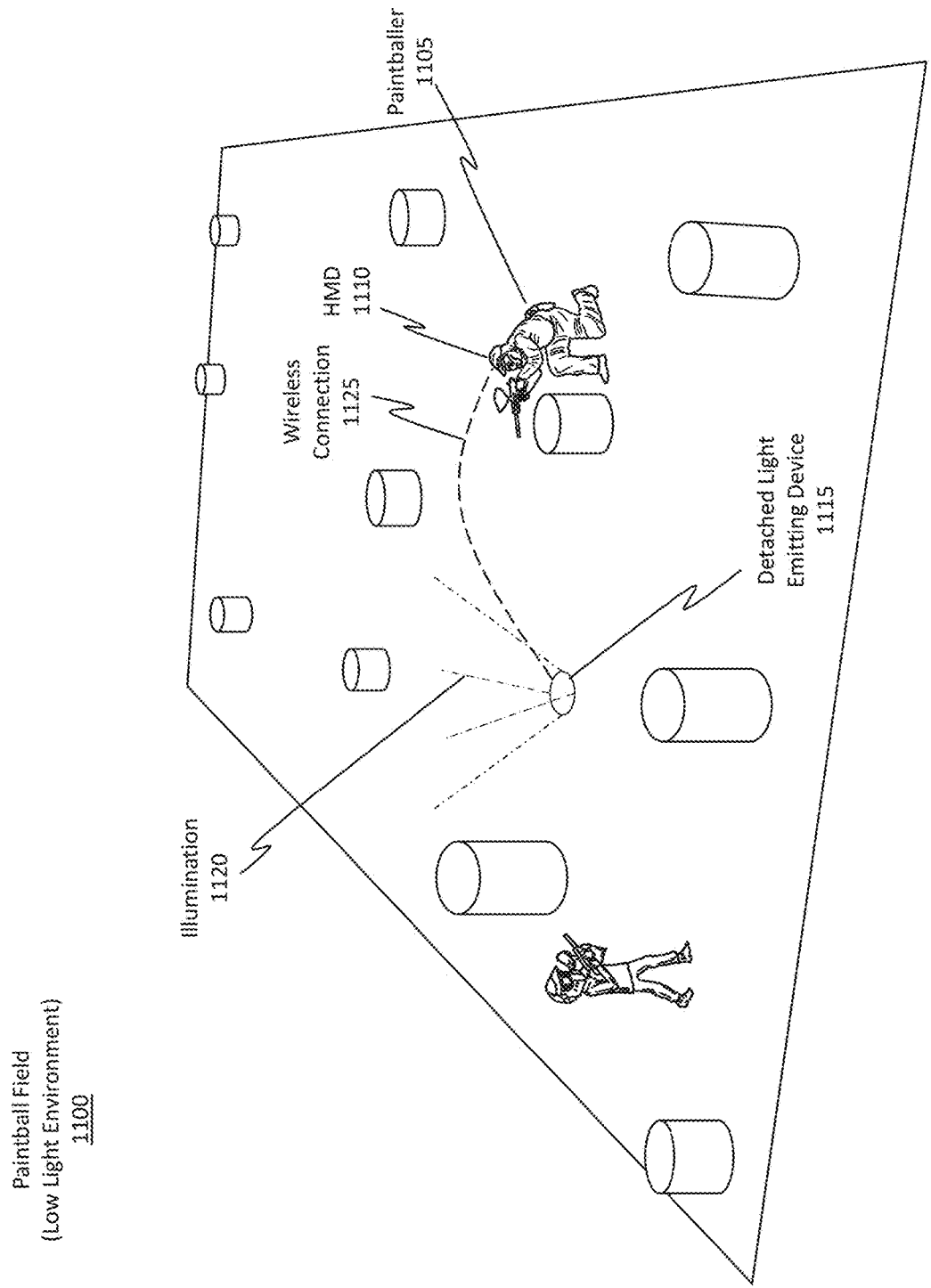
FIG. 11 illustrates an example of a detached light emitting device.

FIG. 11 illustrates another example paintball field 1100 (another low light environment). This field includes a paintballer 1105, who is wearing an HMD 1110. The HMD 1110 is communicating with a detached light emitting device 1115 that is currently emitting an illumination 1120 having the wavelengths discussed earlier. That is, the HMD 1110 has a wireless connection 1125 with the detached light emitting device 1115. The HMD 1110 is able to control the detached light emitting device 1115 in the same manner as if the detached light emitting device 1115 were attached to the HMD 1110. Accordingly, any type of light emitting device, whether attached or detached, may be used.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
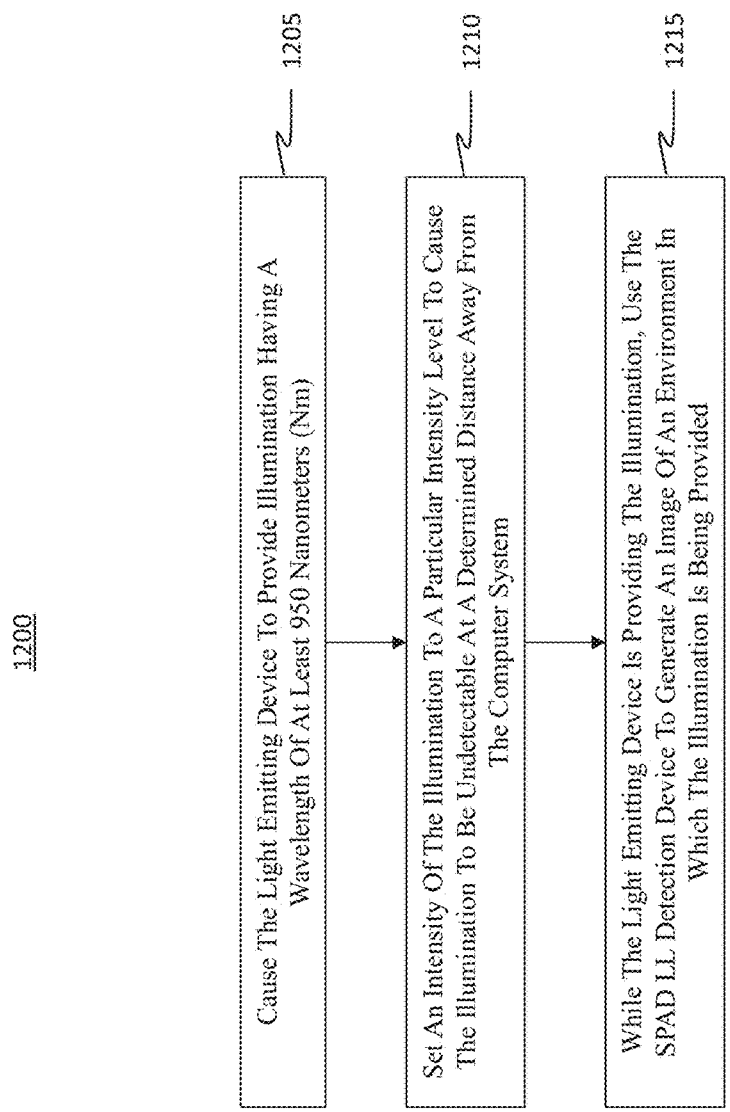
FIG. 12 illustrates a flowchart of an example method for providing an illumination system that emits illumination light while avoiding being detectable by other light detection systems.

Attention will now be directed to FIG. 12, which illustrates a flowchart of an example method 1200. The method 1200 may be performed using a computer system configured to provide an illumination system that provides or emits illumination into an environment while also being undetectable to other external light detection systems. This computer system can include a single photon avalanche diode (SPAD) low light (LL) detection device, a light emitting device, processor(s), and computer-readable hardware storage device(s). Optionally, the light emitting device can be one of an IR laser or an IR LED. Furthermore, the light emitting device can be angled downward relative to a horizontal line of sight of the computer system. In some cases, the light emitting device is attached to the computer system while in other cases the light emitting device is detached from the computer system and communicates with the computer system via a wireless connection.

Initially, method 1200 includes an act (act 1205) of causing the light emitting device to provide illumination having a wavelength of at least 950 nanometers (nm). In some implementations, the wavelength of the illumination is at least 1,000 nm.

As a result of the illumination having a particular roll off rate, there is an act (act 1210) of setting an intensity of the illumination to a particular intensity level to cause the illumination to be undetectable at or from a determined distance away from the computer system. Notably, the determined distance is based on the particular roll off rate (e.g., $1/R^2$). In some cases, the determined distance away from the computer system is from 1 meter up to about 5 meters.

While the light emitting device is providing the illumination, there is an act (act 1215) of using the SPAD LL detection device to generate an image of an environment in which the illumination is being provided. That image can be a passthrough image that is displayed for the user to view, as discussed earlier.

Figure 13:
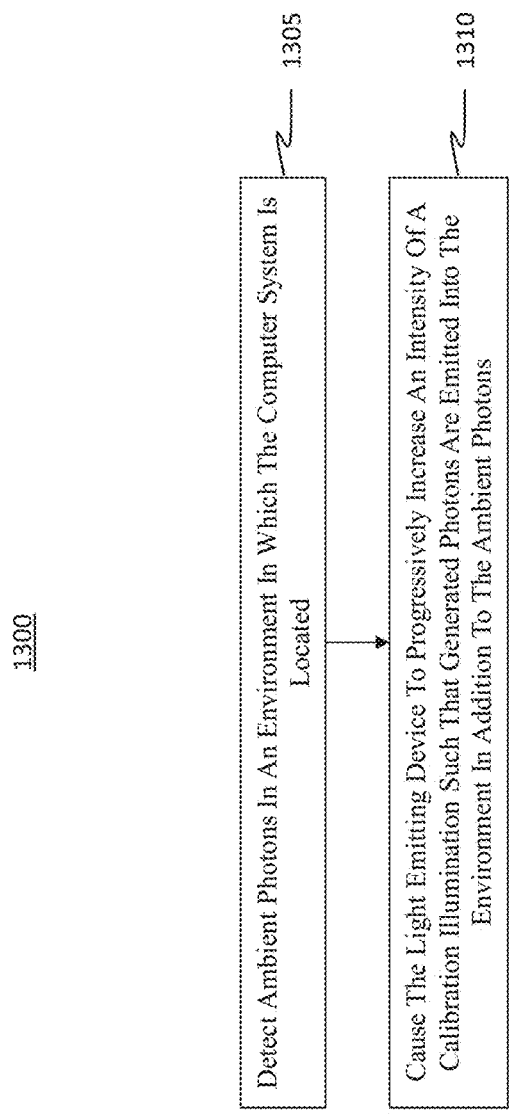
FIG. 13 illustrates an example of a calibration event that can be performed to determine how many photons to project into an environment.

In some cases, prior to causing the light emitting device to provide the illumination, the embodiments perform a calibration operation, which is outlined in FIG. 13. Specifically, FIG. 13 illustrates an example calibration operation 1300 that includes detecting (act 1305) ambient photons in an environment in which the computer system is located. Act 1310 then includes causing the light emitting device to progressively increase an intensity of a calibration illumination such that generated photons are emitted into the environment in addition to the ambient photons.

Figure 14:
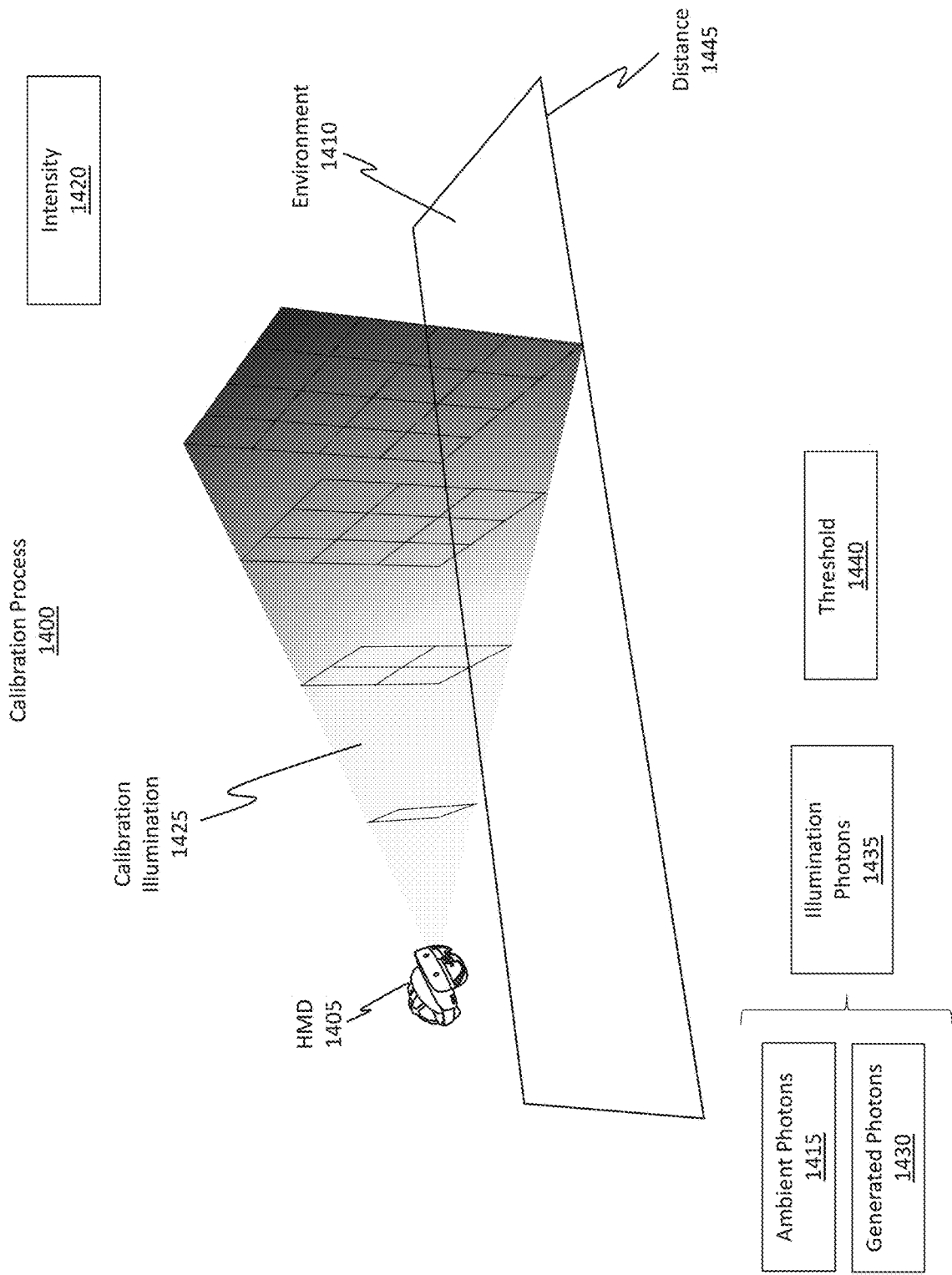
FIG. 14 provides another example of a calibration event.

Notably, a combination of the ambient photons and the generated photons constitutes "illumination photons." Furthermore, the intensity of the calibration illumination is progressively increased until a threshold number of the illumination photons is achieved or is detected in the environment using the SPAD LL detection device. This process results in the calibration illumination being detectable at the determined distance away from the computer system but not beyond the determined distance. FIG. 14 is illustrative of this calibration process.

Specifically, FIG. 14 shows a calibration process 1400 involving an HMD 1405 in an environment 1410, where the HMD 1405 initially refrains from emitting an illumination in order to determine the level of ambient photons 1415 in the environment 1410. The HMD 1405 then progressively increases an intensity 1420 of a calibration illumination 1425 such that generated photons 1430 are emitted into the environment 1410 in addition to the existing ambient photons 1415. The photons are detected by the HMD's SPAD LL detection device. The combination of the ambient photons 1415 and the generated photons 1430 constitute illumination photons 1435.

The intensity 1420 is progressively increased until a threshold 1440 number of illuminated photons 1435 is achieved or is detected, where the threshold 1440 is dependent on a selected distance 1445 away from the HMD 1405. That is, the HMD 1405 will be detectable at or up to the distance 1445 (e.g., by a SPAD LL detection device but not by tradition image intensifier tubes) but not beyond the distance 1445.

Figure 15:
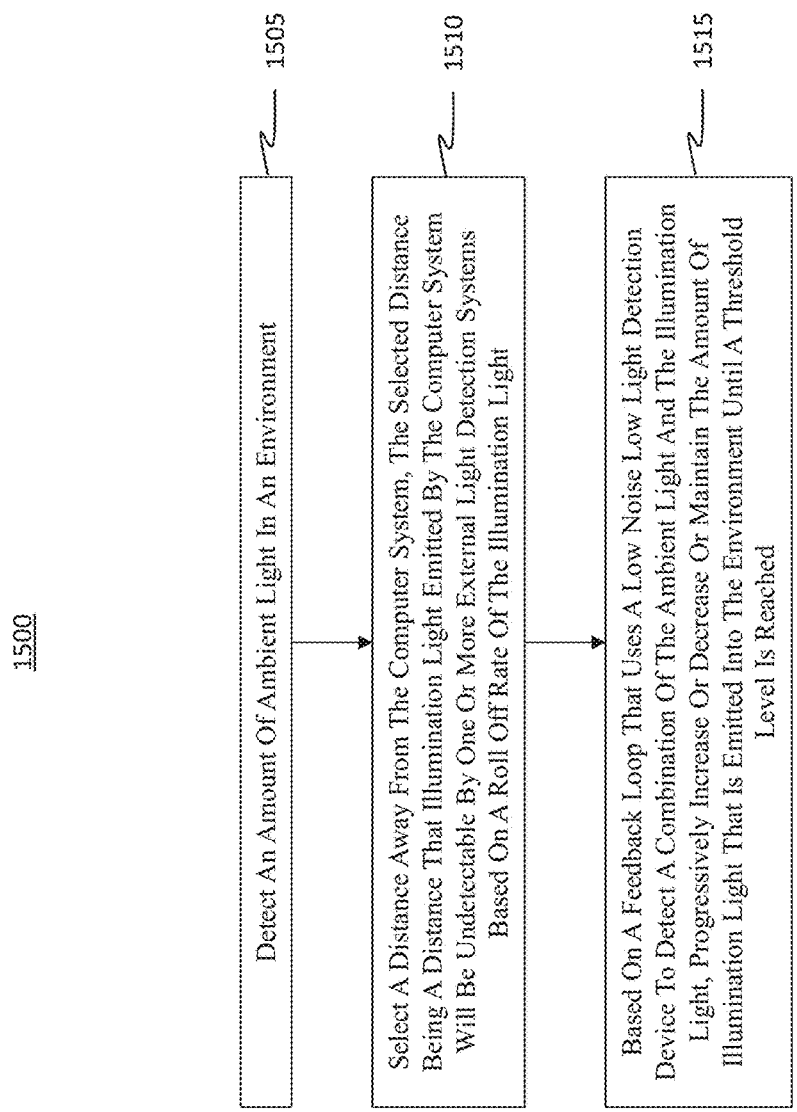
FIG. 15 illustrates a flowchart of an example method for using a feedback loop to dynamically control how much light to emit into an environment.

Attention will now be directed to FIG. 15, which illustrates a flowchart of an example method 1500 in which a computer system is configured to dynamically modify (e.g., increase or decrease) or perhaps maintain an amount of illumination generated by an illumination source to achieve a particular performance level while also causing the computer system to be undetectable by external light detection systems that are of a certain type and/or that are beyond a certain distance away from the computer system. Notably, the method 1500 can be an extension of the method 1200 from FIG. 12. To clarify, the operations presented in connection with FIG. 12 can also be performed in connection with the operations presented in FIG. 15.

Furthermore, the computer system may be in the form of any of the MR systems or HMDs discussed thus far. This computer system utilizes a low noise low light detection device, such as a SPAD LL detection device. The system also utilizes a light emitting device.

Initially, method 1500 includes an act (act 1505) of detecting an amount of ambient light in an environment. Method 1500 then involves selecting (act 1510) a distance away from the computer system. The selected distance is a distance that illumination light emitted by the computer system will be undetectable by one or more external light detection systems (that are at that distance or that are farther away than that distance) based on a roll off rate of the illumination light. For instance, FIG. 6 shows a scenario in which the HMD 600 is emitting illumination light, but an external light detection system 610 is located too far away to detect that light.

Figure 16:
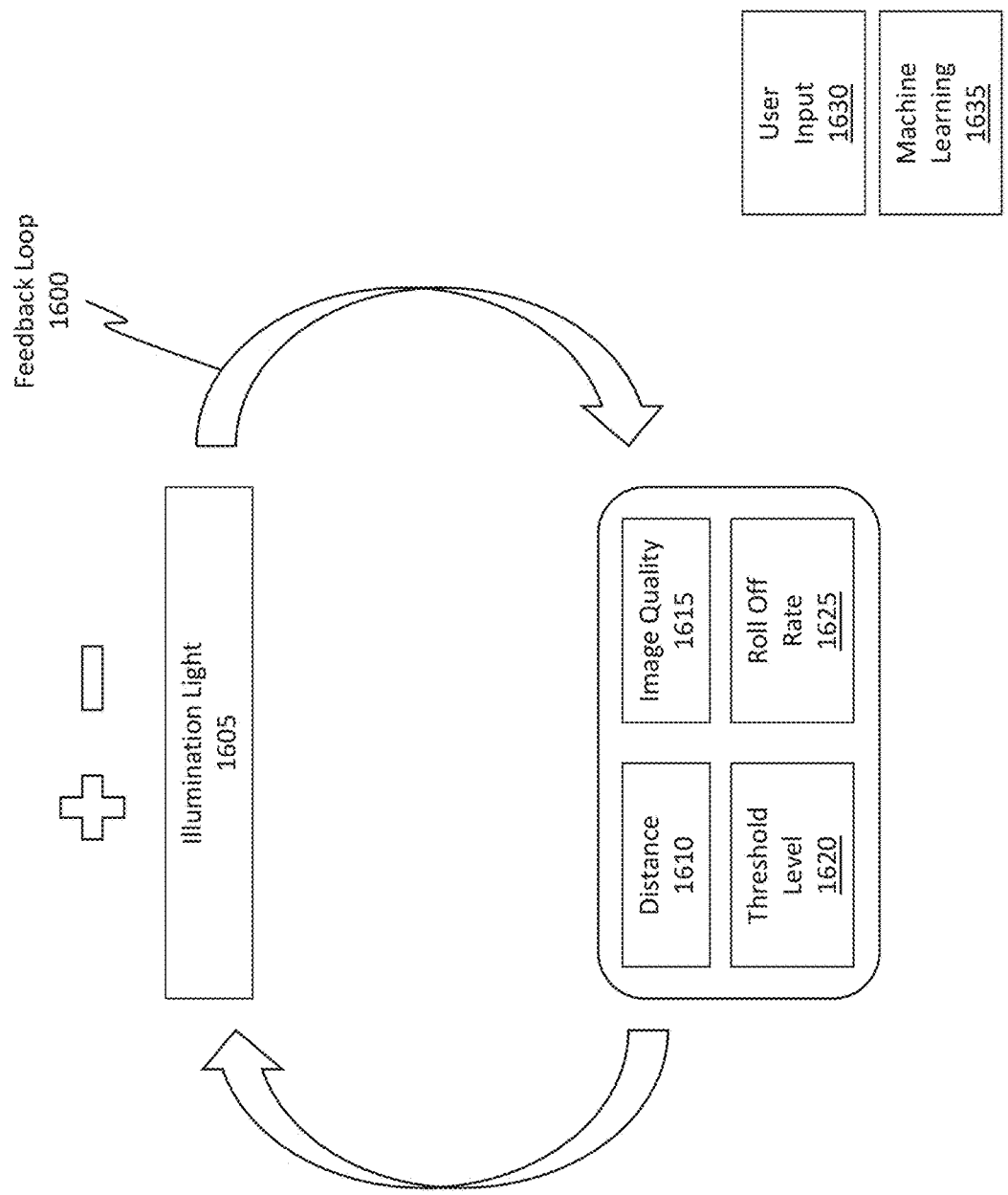
FIG. 16 illustrates another example of the feedback loop.

Based on a feedback loop that uses a low noise low light detection device (e.g., a SPAD LL detection device) to detect a combination of the ambient light and the illumination light, act 1515 includes progressively increasing, decreasing, or perhaps maintaining the amount of illumination light that is emitted into the environment until a threshold level is reached. Notably, the threshold level is based on a combination of the roll off rate of the illumination light and the selected distance. Consequently, when the threshold level is reached, the low noise low light detection device is able to detect content up to the selected distance away but not beyond the selected distance as a result of the illumination light rolling off. Beneficially, other systems (located beyond the distance) are not able to detect the illumination light either. FIG. 16 provides additional details.

FIG. 16 shows a feedback loop 1600, which is representative of the feedback loop mentioned in act 1515 of FIG. 15. Initially, the system is generating an amount of illumination light 1605, though in some instances the system might initially generate no light. The amount of illumination light 1605 can be increased, decreased, or maintained based on certain desired conditions or circumstances occurring. For instance, the amount of illumination light 1605 can be dependent on how far away the system would like to observe content and/or how far away the system is detectable by other systems, as shown by distance 1610. Stated differently, as a result of the illumination light 1605 rolling off at the selected distance 1610, external light detection systems that are located farther than the selected distance 1610 away from the computer system are unable to detect the illumination light 1605. As mentioned earlier, any distance can be used. Typical distances, however, are between 1 and 5 meters away from the computer system.

The resulting image quality 1615 of the image generated by the SPAD LL detection device can also be used to determine how much illumination light 1605 to project. Generally, higher image quality will be achieved with more illumination light. With more light, however, the likelihood of being detected can also occur.

The amount of illumination light 1605 can also be dependent on various thresholds that might be set, as shown by threshold level 1620. For instance, the threshold level 1620 can optionally be based on a combination of the roll off rate 1625 of the illumination light 1605 and the selected distance 1610. Therefore, when the threshold level 1620 is reached, the low noise low light detection device (e.g., a SPAD LL detection device) is able to detect content up to the selected distance 1610 away but not beyond the selected distance as a result of the illumination light 1605 rolling off. Furthermore, systems that are located beyond the selected distance 1610 will not be able to detect the illumination light 1605.

The feedback loop 1600 is able to weight and consider these various conditions (e.g., distance 1610, image quality 1615, threshold level 1620, and roll off rate 1625) in order to influence or dynamically change (e.g., increase, decrease, or maintain) the amount of illumination light 1605 that is emitted.

In some instances, the feedback loop 1600 can also consider or depend on user input 1630 (e.g., input provided by a user of the computer system) and machine learning 1635. For instance, a human operator can change the amount of illumination light 1605 based on preference or operational conditions. Similarly, a machine learning algorithm (e.g., as reflected by machine learning 1635) can also detect operational conditions, environmental conditions, and perhaps even conditions that were missed by the human operator (e.g., perhaps an opponent was detected by the machine learning but not yet observed by the human user), and then automatically adjust the illumination light 1605.

Any type of ML algorithm, model, machine learning, or neural network may be used. As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The amount of illumination light 1605 that is emitted into the environment can vary based on multiple criteria, as discussed herein. In some cases, the amount of the illumination light 1605 is less than about 1 millilux of light. In some cases, the amount is less than about 0.5 millilux. Often, the amount is set so that only a few photons are actually emitted into the environment. In some cases, the amount is less than about 0.1 millilux. In some cases, the amount is more than 1 millilux. Accordingly, the amount of light emitted into the environment by the light emitting device can vary and can range from about 0.01 millilux to about 5.0 millilux. Sometimes, the amount is less than 0.01 millilux or more than 5.0 millilux.

Figure 17:
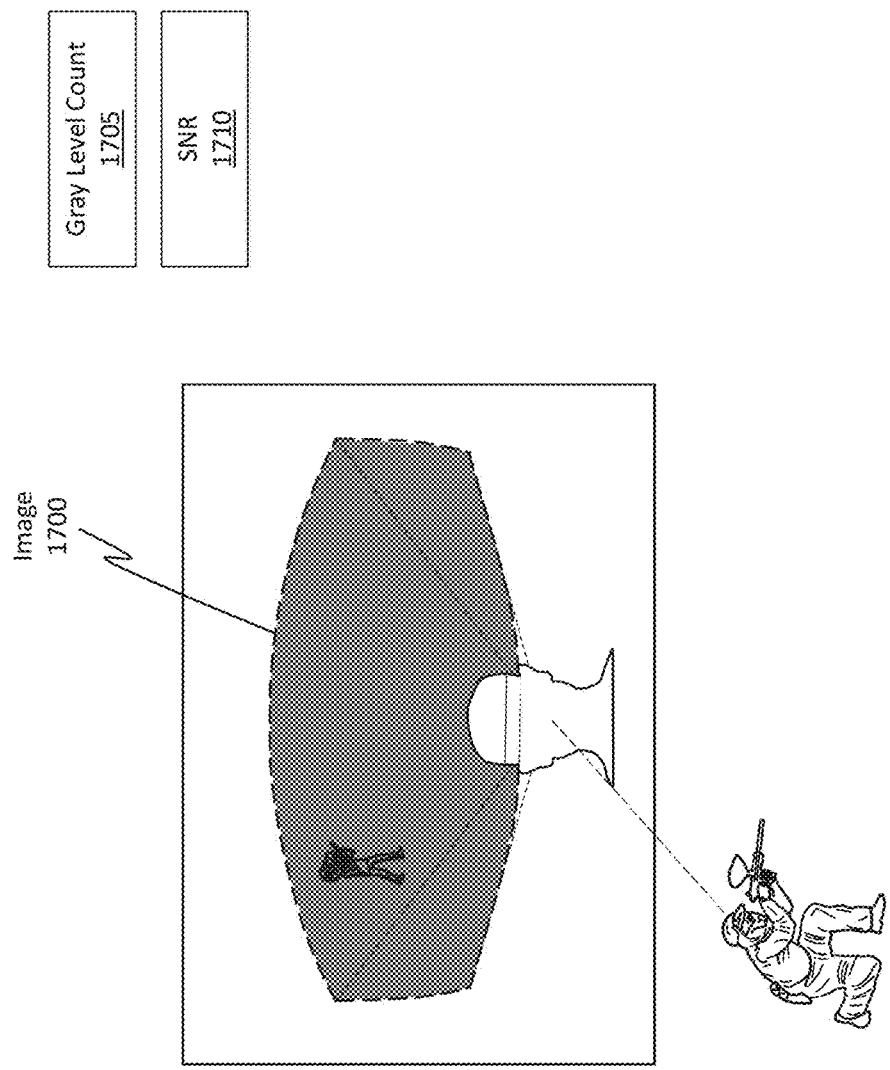
FIG. 17 illustrates how the feedback loop can consider or rely on other pieces of data.

In some cases, the feedback loop 1600 is further based on a gray level count of an image generated by the low noise low light detection device, as shown in FIG. 17. Additionally, the feedback loop 1600 might be based on a signal to noise ratio (SNR) of the resulting image generated by the low noise low light detection device, as also shown by FIG. 17. In any event, progressively increasing or decreasing or perhaps maintaining the amount of light based on the feedback loop 1600 can be performed automatically and/or perhaps manually.

In particular, FIG. 16 shows an image 1700 that is generated using the SPAD LL detection device, as described earlier. The feedback loop mentioned earlier can be based on a gray level count 1705 of the image 1700 and/or the SNR 1710 of the image 1700. That is, an analysis engine (e.g., perhaps the machine learning 1635) can analyze the image 1700 to determine its gray level count 1705 and SNR 1710. Optionally, a histogram can be generated, where the histogram reflects the gray level count. Based on those characteristics, the feedback loop can indicate that more illumination light should be provided, less illumination light should be provided, or the current amount of illumination light should be maintained. High gray level counts and a high SNR indicates the image quality of the image 1700 is poor, thereby suggesting or indicating that additional illumination light is warranted. Lower levels indicate that additional illumination light might not be needed.

Accordingly, the disclosed embodiments are beneficially configured to achieve or satisfy a desired level of performance, such as by generating an image having a threshold level of image integrity or quality. Additionally, the embodiments are able to maintain an "undetected" state by intelligently controlling the amount and type (e.g., wavelength) of light that is emitted into the environment. By controlling the amount of light, the system can generate high quality images while also being undetectable by systems that are of a certain type (e.g., traditional image intensifier tubes) or that are a certain selected distance away.

Example Computer/Computer Systems

Figure 18:
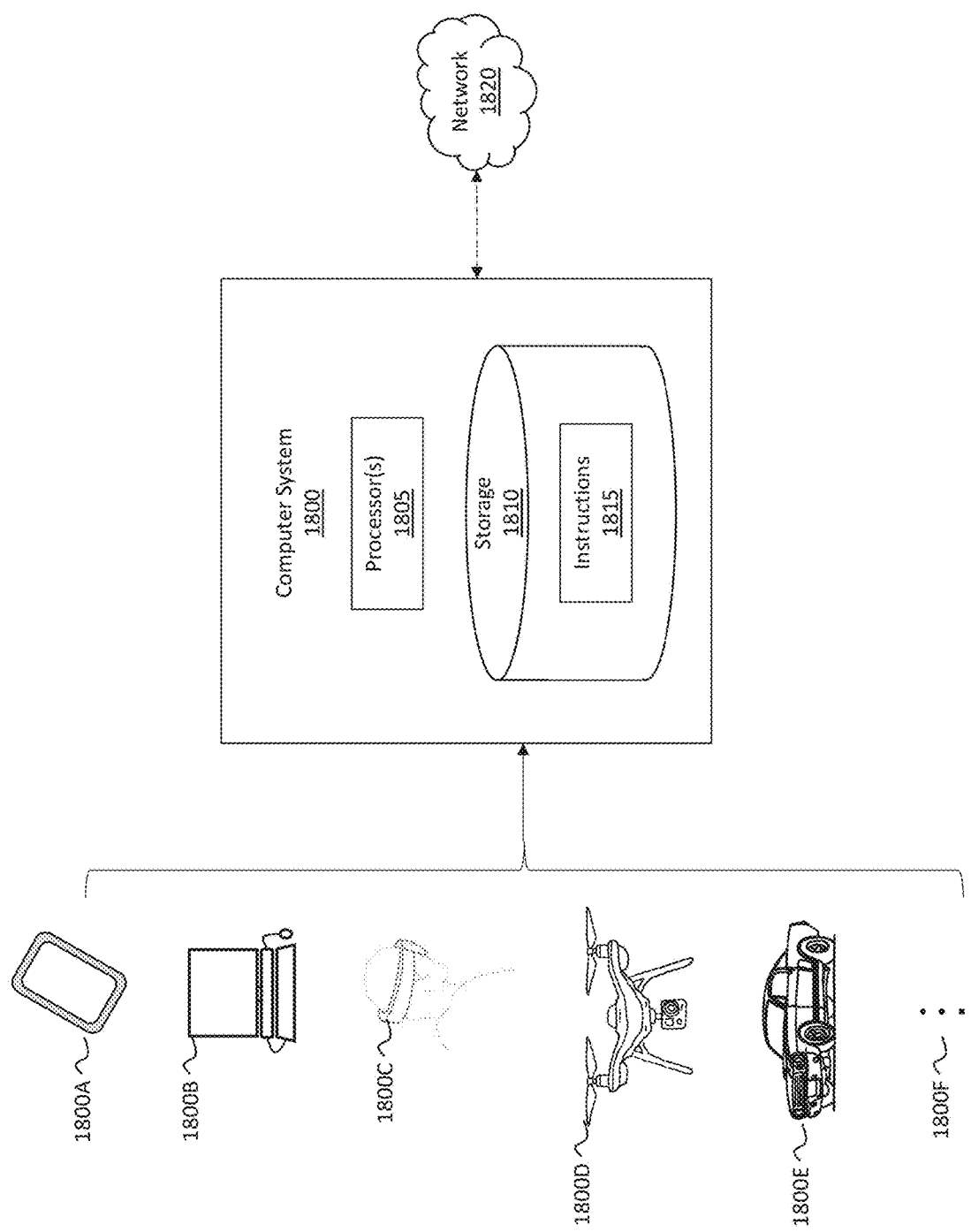
FIG. 18 illustrates an example computer system configured to perform any of the disclosed operations.

Attention will now be directed to FIG. 18 which illustrates an example computer system 1800 that may include and/or be used to perform any of the operations described herein. Computer system 1800 may take various different forms. For example, computer system 1800 may be embodied as a tablet 1800A, a desktop or a laptop 1800B, a wearable device (e.g., HMD 1800C), a drone 1800D, a vehicle 1800E, a mobile device, a standalone device, an MR system, or any other device as illustrated by the ellipsis 1800F. Computer system 1800 may also be a distributed system that includes one or more connected computing components/devices that are in communication with computer system 1800.

In its most basic configuration, computer system 1800 includes various different components. FIG. 18 shows that computer system 1800 includes one or more processor(s) 1805 (aka a "hardware processing unit") and storage 1810.

Regarding the processor(s) 1805, it will be appreciated that the functionality described herein can be performed, at least in part, by one or more hardware logic components (e.g., the processor(s) 1805). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1800. The different components, modules, engines, and services described herein may be implemented as objects or processors that execute on computer system 1800 (e.g. as separate threads).

Storage 1810 may be physical system memory, which may be volatile, non-volatile, or some combination of the two. The term "memory" may also be used herein to refer to non-volatile mass storage such as physical storage media. If computer system 1800 is distributed, the processing, memory, and/or storage capability may be distributed as well.

Storage 1810 is shown as including executable instructions 1815. The executable instructions 1815 represent instructions that are executable by the processor(s) 1805 of computer system 1800 to perform the disclosed operations, such as those described in the various methods.

The disclosed embodiments may comprise or utilize a special-purpose or general-purpose computer including computer hardware, such as, for example, one or more processors (such as processor(s) 1805) and system memory (such as storage 1810), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1800 may also be connected (via a wired or wireless connection) to external sensors (e.g., one or more remote cameras) or devices via a network 1820. For example, computer system 1800 can communicate with any number devices or cloud services to obtain or process data. In some cases, network 1820 may itself be a cloud network. Furthermore, computer system 1800 may also be connected through one or more wired or wireless networks 1820 to remote/separate computer systems(s) that are configured to perform any of the processing described with regard to computer system 1800.

A "network," like network 1820, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1800 will include one or more communication channels that are used to communicate with the network 1820. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system that mitigates detection of the system by external light detection systems, said system comprising a light emitting device, the system comprising:
    one or more processors; and
    one or more hardware storage devices that store instructions that are executable by the one or more processors to cause the system to:
        cause the light emitting device to emit light into an environment;
        cause the light emitting device to set an intensity of the emitted light to a level that results in the emitted light falling off at least at a known distance away from the light emitting device; and
        trigger generation of an image of the environment while the light emitting device is emitting the light into the environment.

2. The system of claim 1, wherein the image is generated using an array of single photon avalanche diode (SPAD) devices.

3. The system of claim 1, wherein the emitted light has a wavelength of at least 950 nanometers.

4. The system of claim 1, wherein the system is a wearable device.

5. The system of claim 1, wherein the light emitting device is an infrared laser.

6. The system of claim 1, wherein the light emitting device is an infrared light emitting diode.

7. The system of claim 1, wherein the emitted light has a wavelength above 900 nanometers.

8. The system of claim 1, wherein the emitted light has a wavelength that is less than about 1,100 nanometers.

9. The system of claim 1, wherein the emitted light has a wavelength within a range of wavelengths spanning about 900 nanometers and about 1,100 nanometers.

10. The system of claim 1, wherein a bandpass filter is used to filter light having wavelengths below about 950 nanometers.

11. A method for mitigating detection of a system by external light detection systems, the system comprising a light emitting device, the method being performed by the system and comprising:
    causing the light emitting device to emit light into an environment;
    causing the light emitting device to set an intensity of the emitted light to a level that results in the emitted light falling off at least at a known distance away from the light emitting device; and
    triggering generation of an image of the environment while the light emitting device is emitting the light into the environment.

12. The method of claim 11, wherein an intensity of the emitted light is adjustable.

13. The method of claim 11, wherein the known distance is about 5 meters away from the light emitting device.

14. The method of claim 11, wherein the known distance is less than about 5 meters away from the light emitting device.

15. The method of claim 11, wherein the known distance is less than about 4 meters away from the light emitting device.

16. The method of claim 11, wherein the known distance is less than about 3 meters away from the light emitting device.

17. The method of claim 11, wherein the known distance is less than about 2 meters away from the light emitting device.

18. A head mounted device (HMD) system that mitigates detection of the HMD by external light detection systems, said HMD comprising a light emitting device, the HMD comprising:

one or more processors; and
one or more hardware storage devices that store instructions that are executable by the one or more processors to cause the HMD to:
cause the light emitting device to emit light into an environment;
cause the light emitting device to set an intensity of the emitted light to a level that results in the emitted light falling off at least at a known distance away from the light emitting device; and
trigger generation of an image of the environment while the light emitting device is emitting the light into the environment.

19. The HMD of claim 18, wherein the known distance is less than about 5 meters away from the light emitting device.

20. The HMD of claim 18, wherein the known distance is less than about 4 meters away from the light emitting device.

* * * * *